(12) United States Patent
Jeong et al.

(10) Patent No.: US 10,921,967 B2
(45) Date of Patent: Feb. 16, 2021

(54) ELECTRONIC DEVICE AND METHOD FOR CONFIGURING DISPLAY THEREOF

(71) Applicant: Samsung Electronics Co., Ltd., Suwon-si (KR)

(72) Inventors: Hyesoon Jeong, Chilgok-gun (KR); Kyuchul Kong, Gumi-si (KR); Jaeyoung Yang, Seongnam-si (KR); Yeongi Jin, Seoul (KR); Daesik Hwang, Daegu (KR); Jinwan An, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 559 days.

(21) Appl. No.: 15/341,364

(22) Filed: Nov. 2, 2016

(65) Prior Publication Data
US 2017/0139576 A1 May 18, 2017

(30) Foreign Application Priority Data

Nov. 18, 2015 (KR) .................. 10-2015-0161994

(51) Int. Cl.
*G06F 3/0484* (2013.01)
*G06F 3/0346* (2013.01)
*G06F 3/0488* (2013.01)

(52) U.S. Cl.
CPC ........ *G06F 3/04845* (2013.01); *G06F 3/0346* (2013.01); *G06F 3/04886* (2013.01);
(Continued)

(58) Field of Classification Search
CPC ......... G06F 3/0346; G06F 2203/04803; G06F 3/04845; G06F 2200/1614; G06F 3/048;
(Continued)

(56) References Cited

U.S. PATENT DOCUMENTS 8,701,049 B2 4/2014 Kim
2004/0257385 A1* 12/2004 Kim ...................... G06F 1/1613
345/649

(Continued)

FOREIGN PATENT DOCUMENTS

KR 10-2013-0054042 A 5/2013
KR 10-2015-0004123 A 1/2015

*Primary Examiner* — Tan H Tran
(74) *Attorney, Agent, or Firm* — Jefferson IP Law, LLP

(57) ABSTRACT

An electronic device is provided. The electronic device includes a rectangular display, at least one sensor, a processor electrically connected to the display and the at least one sensor, and a memory electrically connected to the processor, wherein the memory stores an application program including a first layout to be displayed when the display is substantially oriented in a horizontal orientation and a second layout is played when the display is substantially oriented in a vertical orientation, and the memory stores instructions which, when executed by the processor, causes the process to perform operations including displaying a window including one of the first and second layouts on a part of the display, detecting a change in the orientation of the electronic device by using the at least one sensor, rotating the window about 90 degrees based on the detected orientation change, and continuously maintaining one of the first and second layout in the window.

13 Claims, 15 Drawing Sheets

(52) U.S. Cl.
CPC ............... *G06F 2200/1614* (2013.01); *G06F 2203/04803* (2013.01)

(58) Field of Classification Search
CPC .... G06F 3/04886; G06F 1/1626; G06F 3/147; H04M 1/72519; H04M 2201/42
See application file for complete search history.

(56) References Cited

U.S. PATENT DOCUMENTS

| | | |
|---|---|---|
| 2007/0004451 A1 | 1/2007 | Anderson |
| 2012/0182577 A1 | 7/2012 | Tashiro et al. |
| 2013/0021376 A1* | 1/2013 | Satpathy ................ G09G 5/14 345/649 |
| 2013/0125045 A1* | 5/2013 | Sun ................... G06F 3/04883 715/788 |
| 2013/0139076 A1 | 5/2013 | Mochizuki et al. |
| 2014/0089833 A1 | 3/2014 | Hwang et al. |
| 2014/0184526 A1 | 7/2014 | Cho |
| 2015/0012854 A1 | 1/2015 | Choi et al. |
| 2015/0074589 A1* | 3/2015 | Pan ................... G06F 3/04886 715/781 |
| 2015/0113455 A1 | 4/2015 | Kang et al. |
| 2016/0364121 A1* | 12/2016 | Ting .................. G06F 3/04883 |
| 2018/0232139 A1* | 8/2018 | Okuda ................ G06F 3/0488 |

\* cited by examiner

ELECTRONIC DEVICE AND METHOD FOR CONFIGURING DISPLAY THEREOF

CROSS-REFERENCE TO RELATED APPLICATION(S)

This application claims the benefit under 35 U.S.C. § 119(a) of a Korean patent application filed on Nov. 18, 2015 in the Korean Intellectual Property Office and assigned Serial No. 10-2015-0161994, the entire disclosure of which is hereby incorporated by reference.

TECHNICAL FIELD

The present disclosure relates to an electronic device. More particularly, the present disclosure relates to a display configuration for an electronic device.

BACKGROUND

With the development of a mobile communication technology and a processor technology, a portable terminal device (hereinafter, refer to as "electronic device") has been able to implement various applications as well as a call function of the related art. For example, various applications such as internet browsers, games, calculators, etc. are developed and utilized on the electronic device.

A display of the electronic device is prepared in a rectangular shape whose height is generally longer than its width, and for a user's convenience, it has been defined to implement the orientation of an application in a vertical or horizontal orientation at the time of development of each application. In addition, the electronic device may sense the orientation of the electronic device itself through a gravity sensor (or a gyro sensor), and some applications such as an internet browser may be configured to change the orientation of an application based on whether the electronic device is vertically or horizontally oriented as sensed through a sensor. An application which defines the orientation change may include a separate layout corresponding to a vertical direction or a horizontal direction.

Recent electronic devices have been implemented with a multi-window function for displaying two or more applications on a single screen at the same time. That is, the electronic device may display, on split areas by which the display is split into two or more areas, a window on which two or more simultaneously executed applications are displayed and an execution screen of each application, or may overlay each window and display the overlaid window.

The above information is presented as background information only to assist with an understanding of the present disclosure. No determination has been made, and no assertion is made, as to whether any of the above might be applicable as prior art with regard to the present disclosure.

SUMMARY

When a plurality of applications are displayed on respective windows according to a display mode (horizontal or vertical mode) in an electronic device that supports a multi-window function, the electronic device may be rotated from horizontal to vertical orientation or vice versa, and thus all of the plurality of applications may be rotated in the same display mode. That is, in a state where the electronic device is in a vertical mode and two applications are being executed thereon, the electronic device is configured to display both of the two applications in a vertical mode, and when the electronic device is rotated in a horizontal orientation and switched to a horizontal mode, the electronic device is configured to display both of the two applications being executed thereon in a horizontal mode.

Since the electronic device may only display applications being executed at the same time in a display mode of the same direction, even if the electronic device is rotated, the display mode may not be changed and a multi-window function may be terminated.

Aspects of the present disclosure are to address at least the above-mentioned problems and/or disadvantages and to provide at least the advantages described below. Accordingly, an aspect of the present disclosure is to provide an electronic device which can configure an appropriate orientation for each of the windows of a plurality of applications simultaneously being executed in a multi-window environment.

In accordance with an aspect of the present disclosure, an electronic device is provided. The electronic device includes a rectangular display, at least one sensor, a processor electrically connected to the display and the at least one sensor, and a memory electrically connected to the processor, wherein the memory stores an application program including a first layout to be displayed when the display is substantially oriented in a horizontal orientation and a second layout to be displayed when the display is substantially oriented in a vertical orientation, and the memory stores instructions which, when executed by the processor, cause the processor to perform operations including displaying a window including one of the first and second layouts on a part of the display, detecting a change in the orientation of the electronic device by using the at least one sensor, rotating the window about 90 degrees at least partially based on the detection of the orientation change, and continuously maintaining one of the first and second layouts in the window.

In accordance with another aspect of the present disclosure, an electronic device is provided. The electronic device includes a rectangular display, at least one sensor, a processor electrically connected to the display and the at least one sensor, and a memory electrically connected to the processor, wherein the memory stores an application program including a first layout to be displayed when the display is substantially oriented in a horizontal orientation and a second layout when the display is substantially oriented in a vertical orientation, and the memory stores instructions which, when executed by the processor, cause the processor to perform operations including displaying a window including one of the first and second layouts on a part of the display, managing selection of the layout in a window displayed on the display at the center, detecting a change in the orientation of the electronic device by using the at least one sensor, identifying, when the orientation of the electronic device is changed in response to the detection, whether the displayed window is configured to continuously maintain one of the first and second layouts or to include one other layout thereof, selecting a layout to be included in the displayed window based on the identification, and displaying the window including the selected layout.

In accordance with another aspect of the present disclosure, an electronic device is provided. The electronic device includes a display, at least one sensor, a processor electrically connected to the display and the at least one sensor, and a memory electrically connected to the processor, wherein the memory stores a plurality of applications including at least one of a first layout to be displayed when the display is oriented in a vertical orientation and a second layout to be displayed when the display is oriented in a horizontal orientation, and the memory stores instructions which, when executed by the processor, cause the processor to perform operations including creating, when the plurality of applications are executed, windows on which the plurality of applications are displayed and displaying the plurality of applications in the first layout or the second layout, and determining, when an event for the change of the layout occurs, a layout of each of the plurality of applications on the basis of configuration information on each of the plurality of applications.

In accordance with another aspect of the present disclosure, a method for configuring a display of an electronic device is provided. The method includes executing a plurality of applications, creating windows on which the plurality of applications are displayed, respectively, and displaying the plurality of applications, on the windows, in a first layout to be displayed when a display is vertically oriented and a second layout to be displayed when the display is horizontally oriented, sensing an event for a change in the layout, and determining a layout of each of the plurality of applications based on the configuration information on each of the plurality of applications.

Various embodiments of the present disclosure may provide an electronic device which can configure an appropriate orientation for each of the windows of a plurality of applications simultaneously being executed in a multi-window environment.

According to various embodiments of the present disclosure, since an orientation for each window of each application can be configured, the display mode may not be changed or a multi-window function may not be terminated even when the electronic device is rotated, thereby providing convenience to a user. That is, the present disclosure may determine an orientation of a multi-window such that the orientation is suitable for the user's intent and attributes of each application, and thus the effectiveness of the multi-window can be further increased.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
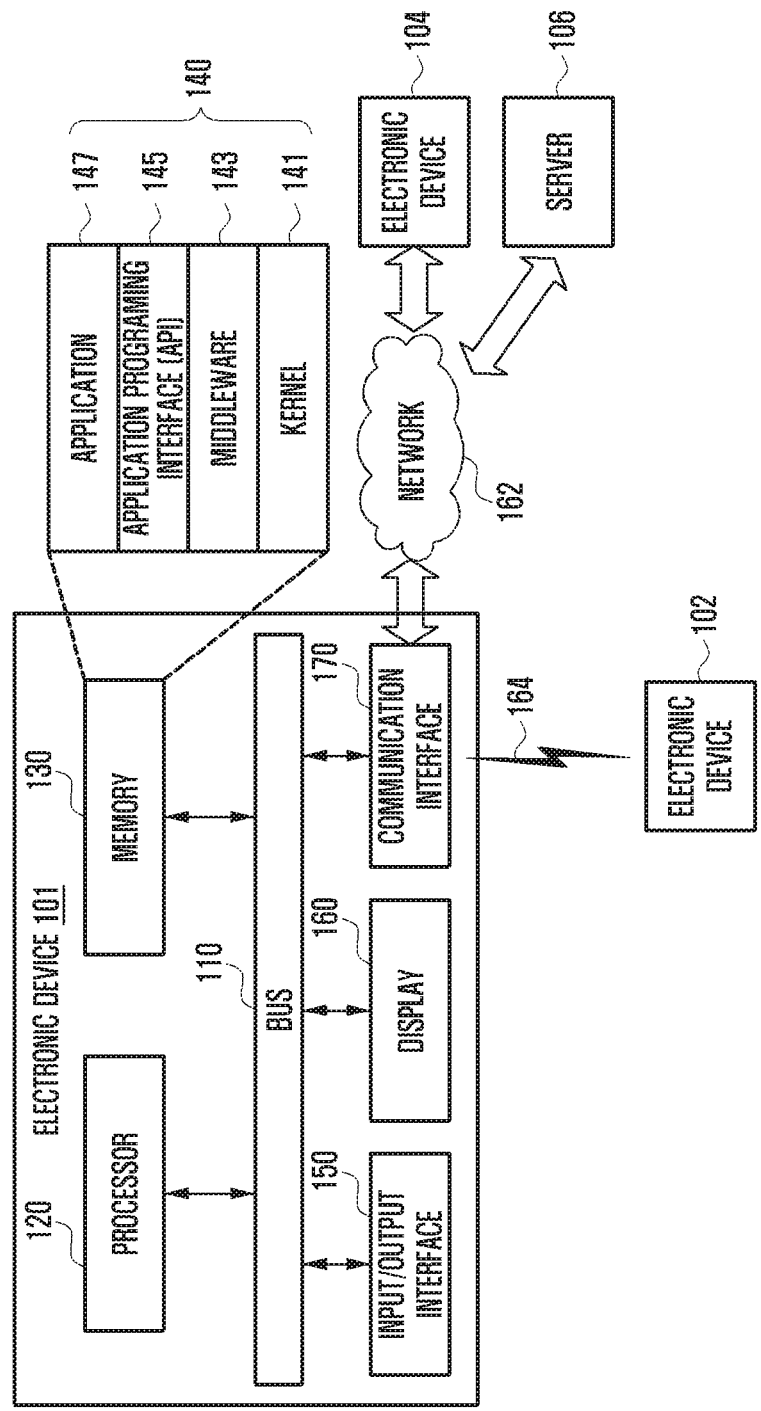
FIG. 1 illustrates an electronic device within a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, operation, element, component, or combination thereof described in a specification and does not exclude presence or addition of at least one other characteristic, numeral, operation, element, component, or combination thereof.

In the present disclosure, an expression "or" includes any combination or the entire combination of together listed words. For example, "A or B" may include A, B, or A and B.

An expression of a first and a second in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Unless differently defined, entire terms including a technical term and a scientific term used here have the same meaning as a meaning that may be generally understood by a person of common skill in the art. It should be analyzed that generally using terms defined in a dictionary have a meaning corresponding to that of a context of related technology and are not analyzed as an ideal or excessively formal meaning unless explicitly defined.

In this disclosure, an electronic device may be a device that involves a communication function. For example, an electronic device may be a smart phone, a tablet personal computer (PC), a mobile phone, a video phone, an e-book reader, a desktop PC, a laptop PC, a netbook computer, a personal digital assistant (PDA), a portable multimedia player), a Moving Picture Experts Group phase 1 or phase 2 (MPEG-1 or MPEG-2) audio layer 3 (MP3) player, a portable medical device, a digital camera, or a wearable device (e.g., a head-mounted device (HMD) such as electronic glasses, electronic clothes, an electronic bracelet, an electronic necklace, an electronic appcessory, or a smart watch).

According to some embodiments of the present disclosure, an electronic device may be a smart home appliance that involves a communication function. For example, an electronic device may be a television (TV), a digital versatile disc (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments of the present disclosure, an electronic device may be a medical device (e.g., magnetic resonance angiography (MRA), magnetic resonance imaging (MRI), computed tomography (CT), ultrasonography, etc.), a navigation device, a global positioning system (GPS) receiver, an event data recorder (EDR), a flight data recorder (FDR), a car infotainment device, electronic equipment for ship (e.g., a marine navigation system, a gyrocompass, etc.), avionics, security equipment, or an industrial or home robot.

According to some embodiments of the present disclosure, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are not to be considered as a limitation of this disclosure.

FIG. 1 is a block diagram illustrating an electronic apparatus according to an embodiment of the present disclosure.

Referring to FIG. 1, the electronic apparatus 101 may include a bus 110, a processor 120, a memory 130, a user input module (input/output interface) 150, a display 160, and a communication interface 170.

The bus 110 may be a circuit for interconnecting elements described above and for allowing a communication, e.g. by transferring a control message, between the elements described above.

The processor 120 can receive commands from the above-mentioned other elements, e.g. the memory 130, the user input module 150, the display 160, and the communication interface 170, through, for example, the bus 110, can decipher the received commands, and perform operations and/or data processing according to the deciphered commands.

The memory 130 can store commands received from the processor 120 and/or other elements, e.g. the user input module 150, the display 160, and the communication interface 170, and/or commands and/or data generated by the processor 120 and/or other elements. The memory 130 may include software and/or programs 140, such as a kernel 141, middleware 143, an application programming interface (API) 145, and an application 147. Each of the programming modules described above may be configured by software, firmware, hardware, and/or combinations of two or more thereof.

The kernel 141 can control and/or manage system resources, e.g. the bus 110, the processor 120 or the memory 130, used for execution of operations and/or functions implemented in other programming modules, such as the middleware 143, the API 145, and/or the application 147. Further, the kernel 141 can provide an interface through which the middleware 143, the API 145, and/or the application 147 can access and then control and/or manage an individual element of the electronic apparatus 101.

The middleware 143 can perform a relay function which allows the API 145 and/or the application 147 to communicate with and exchange data with the kernel 141. Further, in relation to operation requests received from at least one of an application 147, the middleware 143 can perform load balancing in relation to the operation requests by, for example, giving a priority in using a system resource, e.g. the bus 110, the processor 120, and/or the memory 130, of the electronic apparatus 101 to at least one application from among the at least one of the application 147.

The API 145 is an interface through which the application 147 can control a function provided by the kernel 141 and/or the middleware 143, and may include, for example, at least one interface or function for file control, window control, image processing, and/or character control.

The user input module 150 can receive, for example, a command and/or data from a user, and transfer the received command and/or data to the processor 120 and/or the memory 130 through the bus 110. The display 160 can display an image, a video, and/or data to a user.

The communication interface 170 can establish a communication between the electronic apparatus 101 and other electronic devices 102 and 104 and/or a server 106. The communication interface 170 can support short range communication protocols 164, e.g. a Wi-Fi protocol, a Bluetooth (BT) protocol, and a near field communication (NFC) protocol, communication networks, e.g. internet, local area network (LAN), wide area network (WAN), a telecommunication network, a cellular network, and a satellite network, or a plain old telephone service (POTS), or any other similar and/or suitable communication networks, such as network 162, or the like. Each of the electronic devices 102 and 104 may be a same type and/or different types of electronic apparatus.

Figure 2:
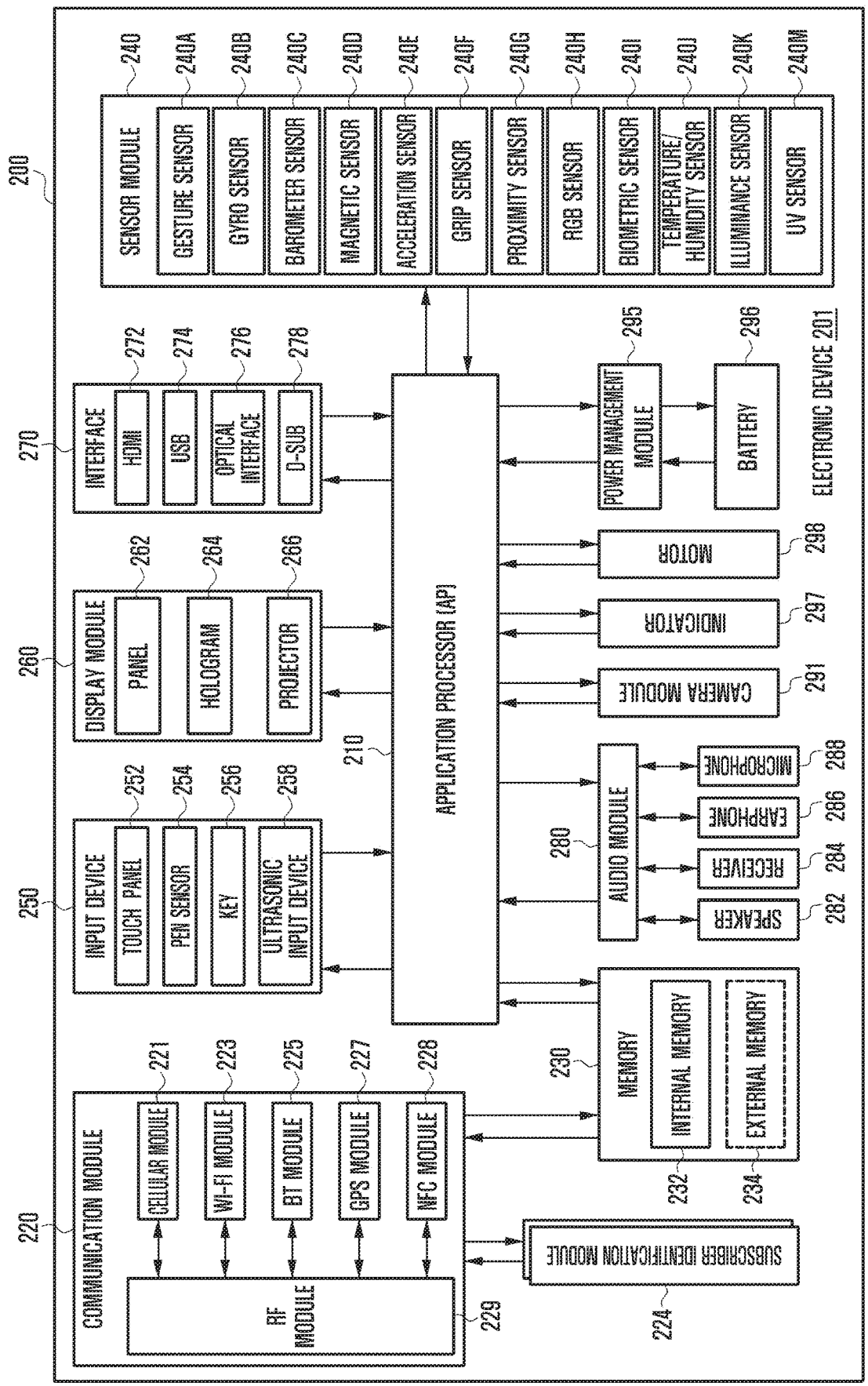
FIG. 2 is a block diagram of an electronic device according to various embodiments of the present disclosure.

FIG. 2 is a block diagram illustrating an electronic device 201 according to an embodiment of the present disclosure. The electronic device 201 may form, for example, the whole or part of the electronic device 101 shown in FIG. 1.

Referring to FIG. 2, the electronic device 201 may include at least one application processor (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, and a motor 298.

The AP 210 may drive an operating system (OS) or applications, control a plurality of hardware or software components connected thereto, and also perform processing and operation for various data including multimedia data. The AP 210 may be formed of system-on-chip (SoC), for example. According to an embodiment of the present disclosure, the AP 210 may further include a graphics processing unit (GPU) (not shown).

The communication module 220 (e.g., the communication interface 260) may perform a data communication with any other electronic device (e.g., the electronic device 204 or the server 206) connected to the electronic device 200 (e.g., the electronic device 201) through the network. According to an embodiment of the present disclosure, the communication module 220 may include therein a cellular module 221, a Wi-Fi module 223, a BT module 225, a GPS module 227, an NFC module 228, and a radio frequency (RF) module 229.

The cellular module 221 may offer a voice call, a video call, a message service, an internet service, or the like through a communication network (e.g., long-term evolution (LTE), LTE-advanced (LTE-A), code division multiple access (CDMA), wideband CDMA (WCDMA), universal mobile telecommunication system (UMTS), wireless broadband (WiBro), or global system for mobile communication (GSM), etc.). Additionally, the cellular module 221 may perform identification and authentication of the electronic device in the communication network, using the SIM card 224. According to an embodiment of the present disclosure, the cellular module 221 may perform at least part of functions the AP 210 can provide. For example, the cellular module 221 may perform at least part of a multimedia control function.

According to an embodiment of the present disclosure, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment of the present disclosure.

According to an embodiment of the present disclosure, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the Wi-Fi module 223, the BT module 225, the GPS module 227 and the NFC module 228 may include a processor for processing data transmitted or received therethrough. Although FIG. 2 shows the cellular module 221, the Wi-Fi module 223, the BT module 225, the GPS module 227 and the NFC module 228 as different blocks, at least part of them may be contained in a single integrated circuit (IC) chip or a single IC package in an embodiment of the present disclosure. For example, at least part (e.g., the CP corresponding to the cellular module 221 and a Wi-Fi processor corresponding to the Wi-Fi module 223) of respective processors corresponding to the cellular module 221, the Wi-Fi module 223, the BT module 225, the GPS module 227 and the NFC module 228 may be formed as a single SoC.

The RF module 229 may transmit and receive data, e.g., RF signals or any other electric signals. Although not shown, the RF module 229 may include a transceiver, a power amp module), a frequency filter, a low noise amplifier (LNA), or the like. Also, the RF module 229 may include any component, e.g., a wire or a conductor, for transmission of electromagnetic waves in a free air space. Although FIG. 2 shows that the cellular module 221, the Wi-Fi module 223, the BT module 225, the GPS module 227 and the NFC module 228 share the RF module 229, at least one of them may perform transmission and reception of RF signals through a separate RF module in an embodiment of the present disclosure.

The SIM card 224 may be a specific card formed of SIM and may be inserted into a slot formed at a certain place of the electronic device 201. The SIM card 224 may contain therein an IC card identifier (ICCID) or an international mobile subscriber identity (IMSI).

The memory 230 (e.g., the memory 230) may include an internal memory 232 and an external memory 234. The internal memory 232 may include, for example, at least one of a volatile memory (e.g., dynamic random access memory (DRAM), static RAM (SRAM), synchronous DRAM (SDRAM), etc.) or a nonvolatile memory (e.g., one time programmable read only memory (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an embodiment of the present disclosure, the internal memory 232 may have the form of a solid state drive (SSD). The external memory 234 may include a flash drive, e.g., compact flash (CF), secure digital (SD), micro-SD, mini-SD, extreme digital (xD), memory stick, or the like. The external memory 234 may be functionally connected to the electronic device 201 through various interfaces. According to an embodiment of the present disclosure, the electronic device 201 may further include a storage device or medium such as a hard drive.

The sensor module 240 may measure physical quantity or sense an operating status of the electronic device 201, and then convert measured or sensed information into electric signals. The sensor module 240 may include, for example, at least one of a gesture sensor 240A, a gyro sensor 240B, an atmospheric sensor (barometer) 240C, a magnetic sensor 240D, an acceleration sensor 240E, a grip sensor 240F, a proximity sensor 240G, a color sensor 240H (e.g., red, green, blue (RGB) sensor), a biometric sensor 240I, a temperature-humidity sensor 240J, an illumination (illuminance) sensor 240K, and an ultraviolet (UV) sensor 240M. Additionally or alternatively, the sensor module 240 may include, e.g., an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris scan sensor (not shown), or a finger scan sensor (not shown). Also, the sensor module 240 may include a control circuit for controlling one or more sensors equipped therein.

The input device 250 may include a touch panel 252, a (digital) pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 201 through an input tool that generates ultrasonic signals, thus allowing wireless recognition. According to an embodiment of the present disclosure, the electronic device 201 may receive a user input from any external device (e.g., a computer or a server) connected thereto through the communication module 220.

The display 260 (e.g., the display 250) may include a panel 262, a hologram 264, or a projector 266. The panel 262 may be, for example, liquid crystal display (LCD), active matrix organic light emitting diode (AM OLED), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 201. According to an embodiment of the present disclosure, the display 260 may further include a control circuit for controlling the panel 262, the hologram 264, and the projector 266.

The interface 270 may include, for example, a high-definition multimedia interface (HDMI) 272, a universal serial bus (USB) 274, an optical interface 276, or a D-sub (D-subminiature) 278. The interface 270 may be contained, for example, in the communication interface 260 shown in FIG. 2. Additionally or alternatively, the interface 270 may include, for example, a mobile high-definition link (MHL) interface, an SD card/multi-media card (MMC) interface, or an infrared data association (IrDA) interface.

The audio module 280 may perform a conversion between sounds and electric signals. The audio module 280 may process sound information inputted or outputted through a speaker 282, a receiver 284, an earphone 286, or a microphone 288.

The camera module 291 is a device capable of obtaining still images and moving images. According to an embodiment of the present disclosure, the camera module 291 may include at least one image sensor (e.g., a front sensor or a rear sensor), a lens (not shown), an (image signal processor (ISP), not shown), or a flash (e.g., LED or xenon lamp, not shown).

The power management module 295 may manage electric power of the electronic device 201. Although not shown, the power management module 295 may include, for example, a power management IC (PMIC), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment of the present disclosure, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. Although not shown, the electronic device 201 may include a specific processor (e.g., GPU) for supporting a mobile TV. This processor may process media data that comply with standards of digital multimedia broadcasting), digital video broadcasting (DVB), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of application-specific IC (ASIC) chip, field-programmable gate arrays (FPGAs), and programmable-logic device, which have been known or are to be developed.

Figure 3:
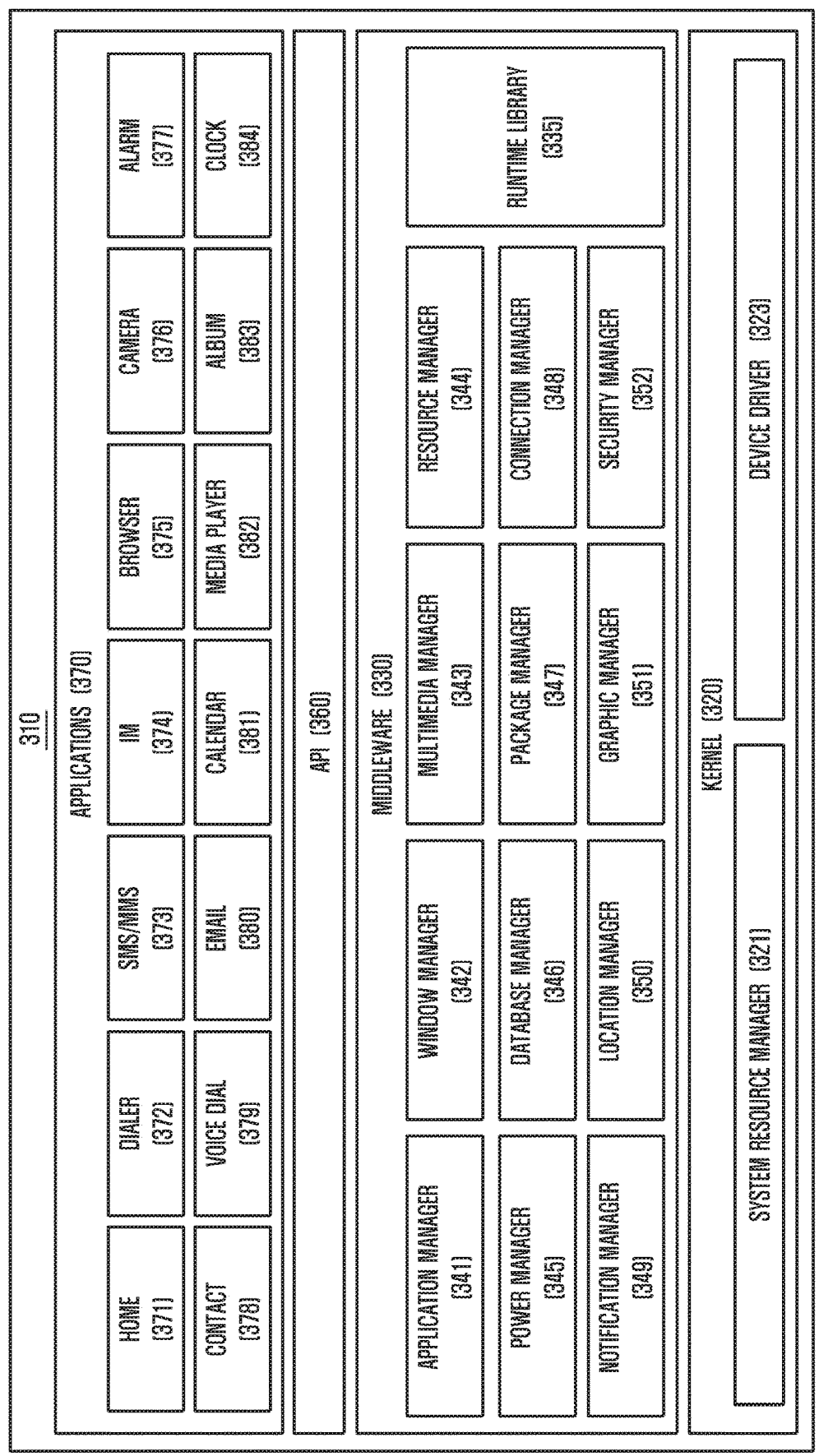
FIG. 3 is a block diagram of a program module according to various embodiments of the present disclosure.

FIG. 3 is a block diagram illustrating a configuration of a programming module 310 according to an embodiment of the present disclosure.

The programming module 310 may be included (or stored) in the electronic device 201 (e.g., the memory 230) illustrated in FIG. 2 or may be included (or stored) in the electronic device 201 (e.g., the memory 230) illustrated in FIG. 2. At least a part of the programming module 310 may be implemented in software, firmware, hardware, or a combination of two or more thereof. The programming module 310 may be implemented in hardware, and may include an OS controlling resources related to an electronic device (e.g., the electronic device 101 or 201) and/or various applications (e.g., an application 370) executed in the OS. For example, the OS may be Android, iOS, Windows, Symbian, Tizen, Bada, and the like.

Referring to FIG. 3, the programming module 310 may include a kernel 320, a middleware 330, an API 360, and/or the application 370.

The kernel 320 (e.g., the kernel 241) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and/or the like of system resources. The device driver 323 may include, for example, a display driver (not illustrated), a camera driver (not illustrated), a BT driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 323 may include an inter-process communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 243) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage graphical user interface (GUI) resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a basic input/output system (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and BT. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a UI related to the graphic effect. The security manager 352 may provide various security functions used for system security, user authentication, and the like. According to an embodiment of the present disclosure, when the electronic device (e.g., the electronic device 201) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 245) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 247) may include, for example, a preloaded application and/or a third party application. The applications 370 (e.g., the applications 247) may include, for example, a home application 371, a dialer application 372, a short message service (SMS)/multimedia message service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 310 may be implemented by instructions stored in a non-transitory computer-readable storage medium. When the instructions are executed by one or more processors (e.g., the AP 210), the one or more processors may perform functions corresponding to the instructions. The non-transitory computer-readable storage medium may be, for example, the memory 220. At least a part of the programming module 310 may be implemented (e.g., executed) by, for example, the one or more processors. At least a part of the programming module 310 may include, for example, a module, a program, a routine, a set of instructions, and/or a process for performing one or more functions.

Hereinafter, various embodiments of the present disclosure for adjusting a display mode will be described through FIGS. 4, 5, 6A, 6B, 7, 8, 9, 10, 11, 12, 13, and 14 in more detail.

In various embodiments of the present disclosure, an electronic device may include a processor and a memory so as to execute various applications and include a display for displaying the executed applications, and the electronic device may be, for example, a smart phone, a tablet PC, etc. According to various embodiments of the present disclosure, an electronic device may provide a multi-window function for simultaneously executing two or more applications and displaying each of the applications on one screen at the same time.

In various embodiments of the present disclosure, the application is a well-known application program which can be stored, installed, and executed in the electronic device, and may include, for example, a dialer, an SMS/MMS, an internet browser, a game, a calculator, etc.

In various embodiments of the present disclosure, the electronic device may include a display of a rectangular shape whose height is longer than its width, and identify whether the display is oriented in a horizontal direction or a vertical direction through at least one sensor. That is, it may be defined that when a short side of the display faces up/down with respect to the ground, the display is vertically oriented, and when the long side of the display faces up/down with respect to the ground, the display is horizontally orientated.

Here, the electronic device may determine the orientation of the display according to the a range of an angle between the display and the ground, and when the orientation of the display is changed from horizontal to vertical or vice versa, the electronic device may determine such that the orientation of the display is maintained within a predetermined angle range, in order to prevent iterative changes in the layout of the application.

In various embodiments of the present disclosure, a window may correspond to each of the applications, and may be defined as an area on the display on which a screen is displayed according to the execution of the plurality of applications. As described above, the electronic device may support a multi-window function, and when two applications are executed at the same time on the electronic device, two windows are individually defined on the display.

Here, a plurality of windows corresponding to a plurality of applications may be displayed such that separate layers are overlapped with each other. In this case, one of the plurality of windows may be a background window displayed on the background and one or more other windows may be pop-up windows displayed on a layer above the background window. In addition, the plurality of windows corresponding to the plurality of applications may be split windows defined on areas divided from each other on the display. The display format of multiple windows as described above may be determined according to the configuration information of each application or the user's configuration.

In various embodiments of the present disclosure, each application may define at least one layout. At least one application may include a first layout to be displayed when the display is vertically oriented and a second layout to be displayed when the display is horizontally oriented. The first layout is a shape whose horizontal direction is short and vertical direction is long, and the second layout is a shape whose horizontal direction is long and vertical direction is short, and for example, a part of the information displayed at the bottom on the first layout may be displayed on the right side on the second layout.

In addition, at least one other application may have a fixed layout regardless of the orientation of the display. That is, for an application whose layout is fixed to be vertical, even when the orientation of the display is changed from vertical to horizontal, the layout may be not changed and maintain a shape whose vertical length is short and horizontal length is long.

According to various embodiments of the present disclosure, an electronic device and a method for configuring a display thereof may individually configure (vertically or horizontally), for each window, display modes of the plurality of applications being executed. Therefore, the display mode can be individually configured for each window according to the user's input operation such as the rotation of the electronic device and change in the size of a window, or characteristics of an application UI being executed.

Figure 4:
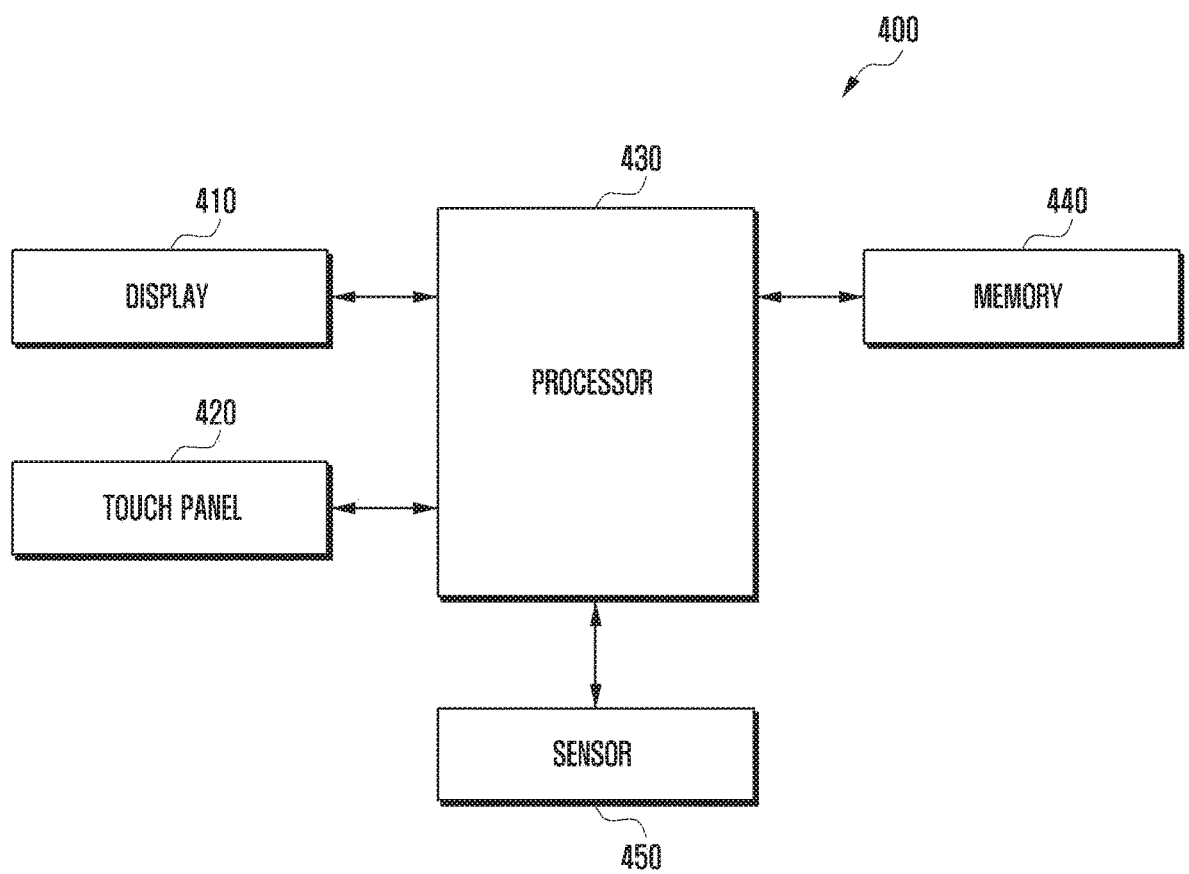
FIG. 4 is a block diagram of an electronic device according to various embodiments of the present disclosure.

FIG. 4 is a block diagram of an electronic device 400 according to various embodiments of the present disclosure.

Referring to FIG. 4, the electronic device 400 may include a display 410, a touch panel 420, a processor 430, a memory 440, and a sensor 450, and there is no problem to implement various embodiments of the present disclosure even if a part of the illustrated configuration is omitted or replaced. The electronic device may include at least a part of the configurations of the electronic device 101 of FIG. 1 and/or the electronic device 201 of FIG. 2.

The display 410 may display an image generated according to the execution of an application, and is implemented with a known display panel such as an LCD, an OLED display, etc. The display 410 may include at least a part of the configuration of the display 160 of FIG. 1. The display 410 may be implemented in a rectangular shape.

The touch panel 420 may be prepared on the display 410 and sense the user's touch through at least one of a capacitive scheme, a resistive scheme, an infrared scheme, and an ultrasonic scheme.

The processor 430 may be configured to perform an operation or data processing regarding control and/or communication of each elements of the electronic device 400, and include at least one of the configurations of the processor of FIG. 1 and/or the AP of FIG. 2. The processor 430 may be electrically connected to the display 410, at least one sensor 450, and the memory 440.

The memory 440 may temporarily or permanently store various digital data and include at least one of the configurations of the memory 130 of FIG. 1 and/or the memory 230 of FIG. 2. The electronic device 400 may include a plurality of memories and it can be construed that the memory 440 in FIG. 4 includes at least a part of the plurality of memories included in the electronic device 400.

The memory 440 may include a volatile memory and a non-volatile memory. The non-volatile may include at least one of an OTPROM, a PROM, an EPROM, an EEPROM, a mask ROM, a flash ROM, a flash memory (for example, a NAND flash memory or a NOR flash memory), a hard disk drive, an SSD, and the like, and the volatile memory may include at least one of a DRAM, an SRAM, or an SDRAM.

According to various embodiments of the present disclosure, the memory 440 may store at least one application and instructions for determining each layout when the application is executed.

In various embodiments of the present disclosure, the instructions may include a control command such as arithmetic and logic operations, data movement, and input/output that can be recognized by the processor 430. In addition, the instructions may be defined on a framework of a platform for the electronic device 400. Hereinafter, according to various embodiments of the present disclosure, various operations related to the determination of a window and layout and performed by the processor 430 may be operations performed by the instructions stored in the memory 440 and executed by the processor 430.

The electronic device 400 may include at least one sensor 450, and the at least one sensor 450 may include a gravity sensor (or a gyro sensor) for sensing the orientation of the electronic device 400.

The processor 430 may create a window on which each application is displayed when the plurality of applications are executed.

The processor 430 may create a plurality of windows for displaying a plurality of applications, respectively, when the plurality of applications are executed, and display the plurality of applications in a first layout or the second layout. Thereafter, when an event for changing the layout occurs, the processor 430 may determine layouts of the plurality of applications based on each piece of configuration information of the plurality of applications. According to various embodiments of the present disclosure, the processor 430 may individually determine the window and layout for each application being executed and allow each application to have different orientation information.

According to various embodiments of the present disclosure, an event for changing the layout may occur when the orientation of the display 410 is changed from horizontal to vertical or vice versa, or the size of one of the pop-up windows is changed according to the user's input so that one of the horizontal length or vertical length of the pop-up window increases by a threshold value or more than the length of the other.

When the event for changing the layout occurs, the processor 430 may identify configuration information for each application. According to various embodiments of the present disclosure, each application may include configuration information related to the UI characteristics, and the configuration information may include information on the orientation and layout of a window in which the application is displayed.

For example, when a multi-window function is executed, an internet browser application may include a first layout in a vertical orientation and a second layout in a horizontal orientation and be configured to maintain the window size and position according to the rotation of the display 410. In addition, a game application includes a fixed layout in a horizontal direction, and the orientation of the window may be configured to rotate about 90 degrees to the horizontal and vertical directions according to the horizontal or vertical direction of the display 410.

The processor 430 may determine layouts of a plurality of applications, respectively, based on the configuration information of each application. For example, when the orientation of the display 410 is changed from a vertical direction to a horizontal direction and an application is configured to change a layout, the size and coordinates of the window may change the orientation from a vertical direction to a horizontal direction and change a conventionally displayed first layout to a second layout. In addition, when the orientation of the display 410 is fixed in a vertical direction, the orientation of the display 410 is changed from a vertical direction to a horizontal direction, and an application is configured to have a fixed layout in a vertical direction, the direction of a window may be rotated about 90 degrees and continuously include the fixed layout in the rotated window.

At the time of the event occurrence, when a window for each application and a layout to be displayed in the window are determined, the processor 430 may combine windows of applications to create a single screen.

According to various embodiments of the present disclosure, one of the windows corresponding to a plurality of applications is a background window displayed on the background, and one or more other windows may be pop-up windows displayed on a layer above the background window. In addition, the plurality of windows corresponding to the plurality of applications may be split windows defined on areas divided from each other on the display 410. The display format of multiple windows as described above may be determined according to the configuration information of each application or the user's configuration.

According to various embodiments of the present disclosure, the display 410 may include a first area and a second area divided from each other, and for example, the first area may be an area on the front surface of the display 410, and the second area may be an edge area on the right side or left side of the display 410. The processor 430 may allow determining of the layout of a screen displayed on each area according to the orientation of the display 410.

According to various embodiments of the present disclosure, when an application is executed, the processor 430 may display, on a part of the display 410, a window including one of a first layout to be displayed when the display 410 is substantially horizontally oriented or a second layout to be displayed when the display is substantially vertically oriented. In a state where one of the layouts is displayed on the display 410, the sensor 450 may detect the change in the orientation of the electronic device 400 and output a signal corresponding thereto to the processor 430. The processor 430 may allow the window including one of the first layout and second layout according to the change of the orientation to be rotated by about 90 degrees and allow the window to continuously include the conventionally displayed layout. In this case, at the time of rotating the window, the size thereof can be reduced or enlarged, and the application to be displayed in the window may also be reduced or enlarged according to the size of the window. When the orientation of the electronic device 400 is changed, the processor 430 may allow the window to select whether to include the conventional layout, that is, one of the first and second layouts or one other layout of the first layout and the second layout, based on the user's input. The processor 430 may provide a UI for the selection and select whether to maintain or change a layout for each application. In addition, when the orientation of the electronic device 400 is rotated, the processor 430 may determine whether to maintain or change the layout according to the user's input pattern on the display 410 or a hard key (not shown) provided at the side of the electronic device.

When the orientation of the electronic device 400 is changed, the processor 430 may allow the window to select whether to include the conventional layout, that is, one of the first and second layouts, or one other layout of the first layout and the second layout, based on at least one piece of information associated with the displayed application. As described earlier, some applications may be configured to include a first layout in a vertical direction and a second layout in a horizontal direction and maintain the size and location of the window depending on the rotation of the display 410, and other applications may be configured to include a fixed layout in the horizontal and vertical directions and rotate about 90 degrees in the horizontal and vertical directions according to the orientation of the display 410. Here, at least one piece of information associated with the application may include at least a part of the configuration information of the application described above, and when an event for changing the layout occurs, the processor 430 may determine layouts of the plurality of applications, respectively, based on the configuration information of each of the plurality of applications to be displayed on the display 410 and the orientation of the electronic device 410 sensed through the sensor 450.

According to various embodiments of the present disclosure, in response to the orientation change detected through the sensor, the processor 430 may identify whether the displayed window is configured to include the conventional displayed layout or one other layout of the first layout or the second layout. This can be identified by calling the configuration information for each application.

Figure 5:
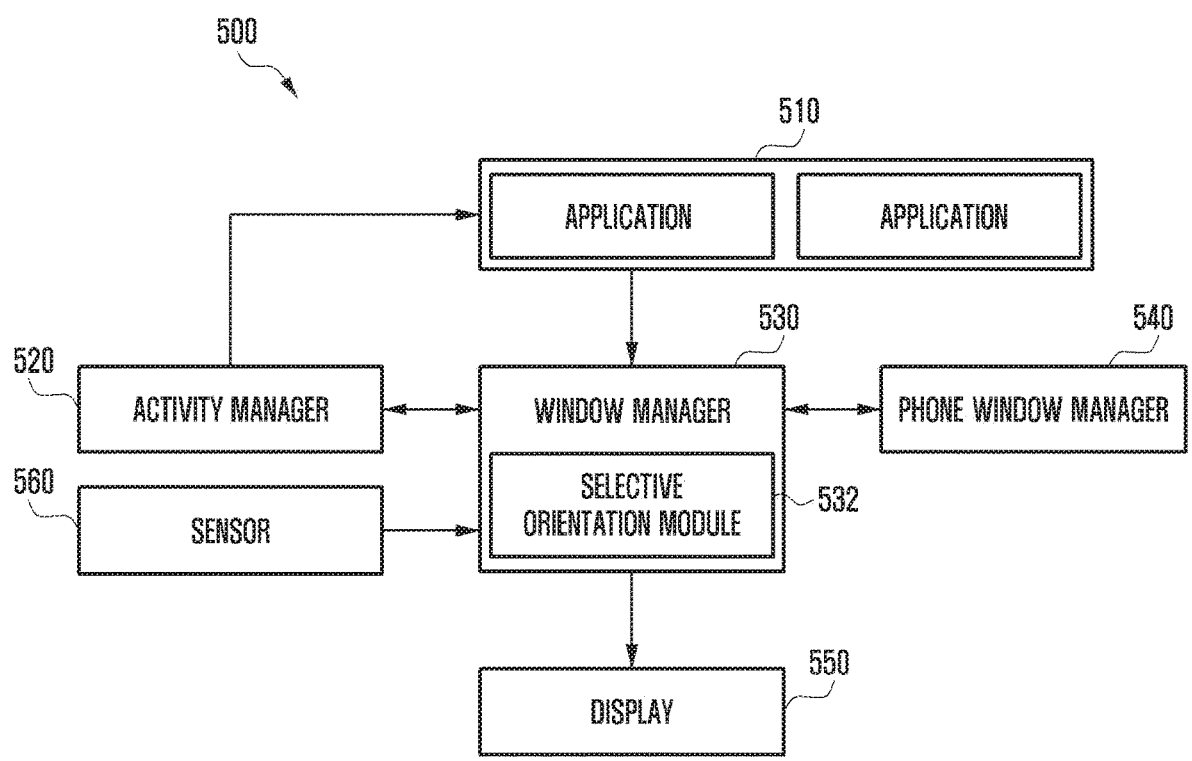
FIG. 5 illustrates software components of an electronic device according to various embodiments of the present disclosure.

FIG. 5 illustrates software components of an electronic device 500 according to various embodiments of the present disclosure.

Referring to FIG. 5, an activity manager 520, a window manager 530, and a phone window manager 540 may be defined on an application framework, and may include instructions that can be performed by the above-described processor 430. The illustrated configuration may be only an example, and at least one part thereof may be partially changed depending on the structure of the platform, which is implemented in the electronic device 500. The above-described software components may be stored in memory 440 and executed by the processor 430.

The electronic device 500 may store a plurality of applications 510 and execute at least a part of the applications at the same time. In this case, screens of applications 510 may be displayed at the same time. Each of the applications 510 may store the configuration information associated with the layout to be displayed according to the orientation of the electronic device 500, which may be called by the window manager 530. Only two applications 500 are illustrated in FIG. 5, but the number of applications is not limited.

A sensor 560 may include a gravity sensor (or gyro sensor) for sensing the orientation of the electronic device 500. When sensing a change in the orientation of the electronic device 500, the sensor 560 may inform of whether the orientation is changed to the window manager 530.

The activity manager 520 may perform a function for managing the execution and a life cycle of each of the applications 510. The window manager 530 may execute a function of individually managing windows on which the plurality of applications 510 are displayed, and include a selective orientation module 532 capable of individually selecting orientations of the plurality of applications 510. The phone window manager 540 may combine individually created windows to perform the function of managing all windows displayed on the whole area of the display 410.

In a state where the plurality of applications 510 are executed, when an event for changing the layout has occurred such that the electronic device 500 is rotated or the size of a pop-up window is changed, the window manager 530 may sense the same. In order to change configuration information of each of the applications 510, the window manager 530 may identify, through the selective orientation module 532, whether each of the applications 510 has a layout fixed in a vertical or horizontal orientation and whether the current window is in a vertical or horizontal direction, and transmit the event information to the activity manager 520. The activity manager 520 may update the configuration information of an application window according to the configuration information for each of the applications 510, and transfer the updated information, that is, rotation and/or resizing of the window, and the change of the layout, to the window manager 530.

The window update content is received by the window manager 530 and transferred to the phone window manager 540 through the selective orientation module 532 in order to configure an individual window for each of the applications 510, and the phone window manager 540 may create a window in a state where each of the applications 510 has different orientation information.

According to various embodiments of the present disclosure, operations related to the generation and updating of the configuration information of the window may be performed by each of the applications 510. When an event for changing the layout occurs, the corresponding event information is transmitted to each of the applications 510, and each of the applications 510 may update the configuration information of the application window according to the configuration information and transfer the updated information to the window manager 530. In this case, the selective orientation module 532 may be omitted in the window manager 530.

The phone window manager 540 may transmit, from the window manager 530, the information on the created window, to the display 550, and the display 550 may display the information.

According to the execution of the above-described components, the electronic device 500 may configure a different display mode for each window of each of the applications 510 according to the configuration information of each of the applications 510 to be executed at the same time.

FIGS. 6A, 6B, 7, 8, 9, 10, 11, 12, and 13 illustrate an application screen displayed on the display 410 of an electronic device 400 according to various embodiments of the present disclosure.

Figure 6A:
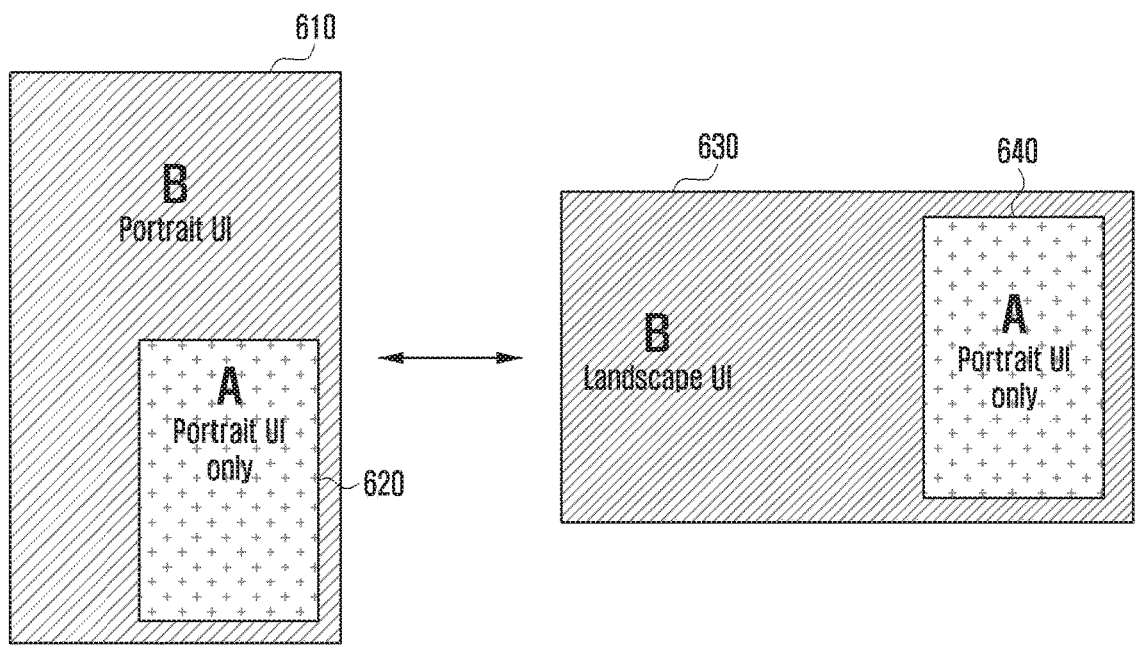
FIGS. 6A, 6B, 7, 8, 9, 10, 11, 12, and 13 illustrate an application screen displayed on a display of an electronic device according to various embodiments of the present disclosure.
Figure 6A:
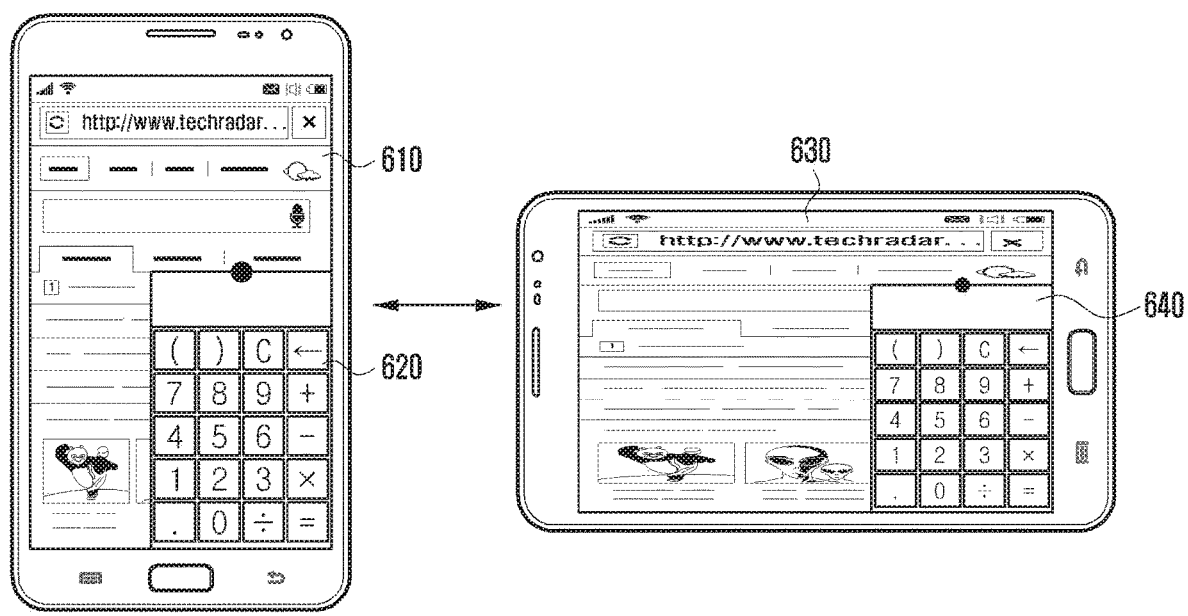

Referring to FIG. 6A, FIG. 6A shows an embodiment of a case where the orientation of the display 410 is changed in a state where an application which can be changed to a first layout and a second layout and an application having a layout fixed in a vertical orientation are being executed on the electronic device 400 at the same time.

An internet browser application having a first layout displayed in a vertical direction and a second layout displayed in a horizontal direction is displayed on the background window 610, and a call application having a layout fixed in a vertical direction may be displayed as a pop-up window 620. When the orientation of the display 410 is in the vertical direction, the processor 430 may display the internet browser application as the first layout on the background window 610, and the call application may be displayed on the pop-up window 620 as a vertically fixed layout.

Hereinafter, the orientation of the display 410 is rotated in a horizontal direction, a result of sensing by the sensor 450 is transferred to the processor 430, and the processor 430 may execute instructions configured to determine a layout of each of the plurality of applications based on the configuration information of each of the plurality of applications.

The processor 430 may check the configuration information of the internet browser application and change the layout from the first layout to the second layout in a state of maintaining a background window of the internet browser (indicated by reference numeral 630). In addition, the processor 430 may check the configuration information of the call application to identify the layout fixed in a vertical direction, and may be configured to rotate the pop-up window of the call application by 90 degrees and display the vertically fixed layout as it is on the rotated pop-up window (indicated by reference numeral 640).

At this time, when the vertical length of the pop-up window is longer than the vertical length of the display 410 as the pop-up window 640 rotates, the size of the pop-up window 640 may be reduced according to the size of the display 410.

Figure 6B:
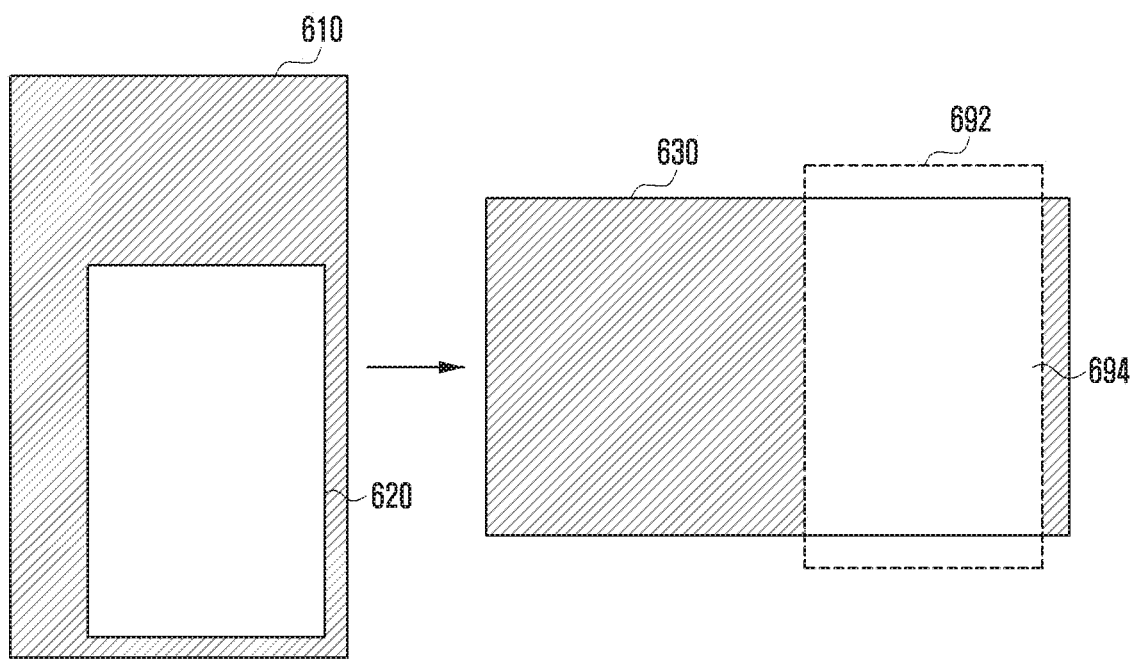

Referring to FIG. 6B, when an entirety of the rotated pop-up window 692 may not be displayed with regard to the vertical length of screen, at least a part (e.g., a part of the upper and lower ends) thereof is excluded and then a remaining part 694 is displayed.

Accordingly, when the internet browser application and the call application having different configuration information for the layout are displayed as a multi-window, even when the orientation of the display 410 is changed, an orientation for each application may be determined in a direction suitable to the field of view of the user.

Figure 7:
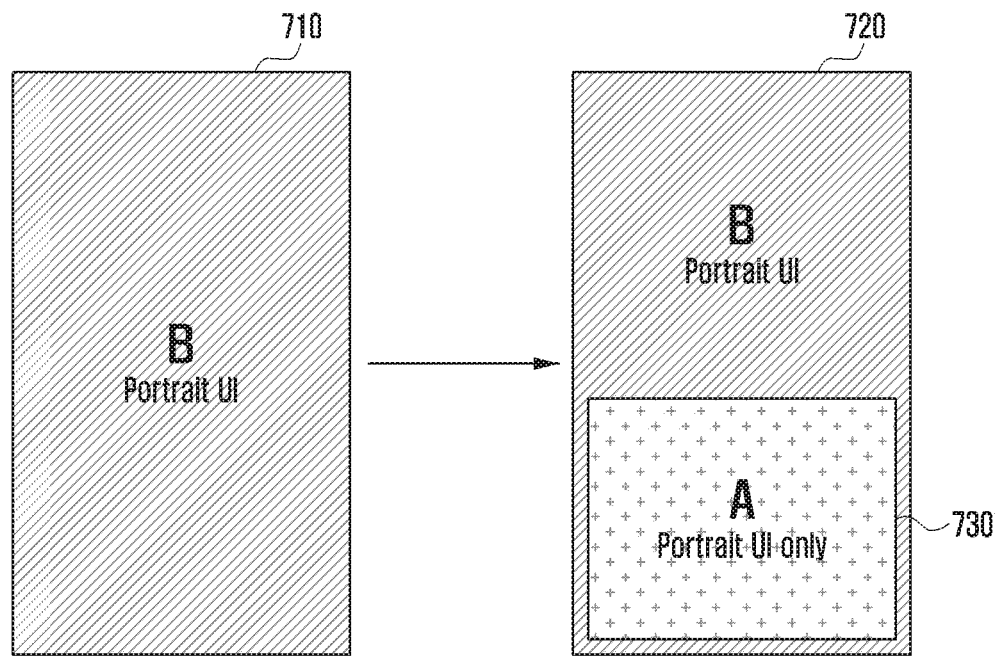
Figure 7:
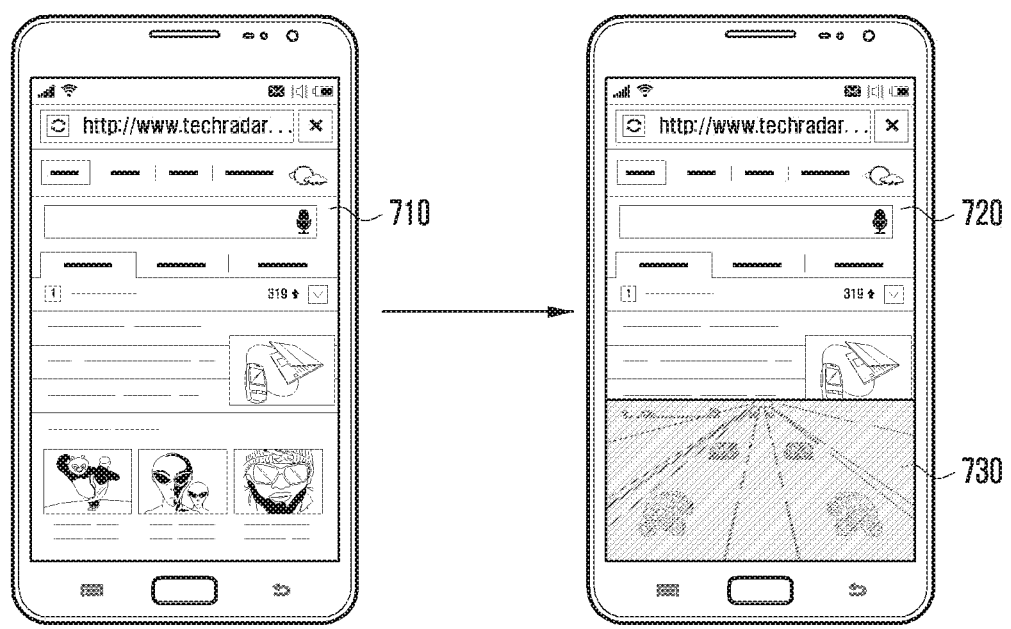

FIG. 7 illustrates an embodiment of a case of executing an application having a horizontally fixed layout in a multi-window in a state where an application which can be changed to the first layout and the second layout is executed on the electronic device 400 according to an embodiment of the present disclosure.

Referring to FIG. 7, the internet browser application may be displayed as a first layout in a state where the display 410 is vertically oriented (indicated by reference numeral 710). Thereafter, when a game application having a horizontally fixed layout is executed according to the user's selection, the processor 430 may maintain the window and the layout of the internet browser application as it is in the background (indicated by reference numeral 720), and maintain a pop-up window of the game application in a shape whose horizontal length is long and determine the orientation thereof in a vertical direction (indicated by reference numeral 730).

In this case, when compared to a case where the game application alone is executed in the entire area of the display 410, the game application may be displayed as the pop-up window 730 in a state where the size thereof is reduced and rotated 90 degrees in a state of maintaining the horizontal and vertical ratio. In addition, as described above through FIG. 6B, when a pop-up window may not be completely displayed with regard to the aspect ratio of the screen, at least a part of the game application may be excluded and then displayed.

Figure 8:
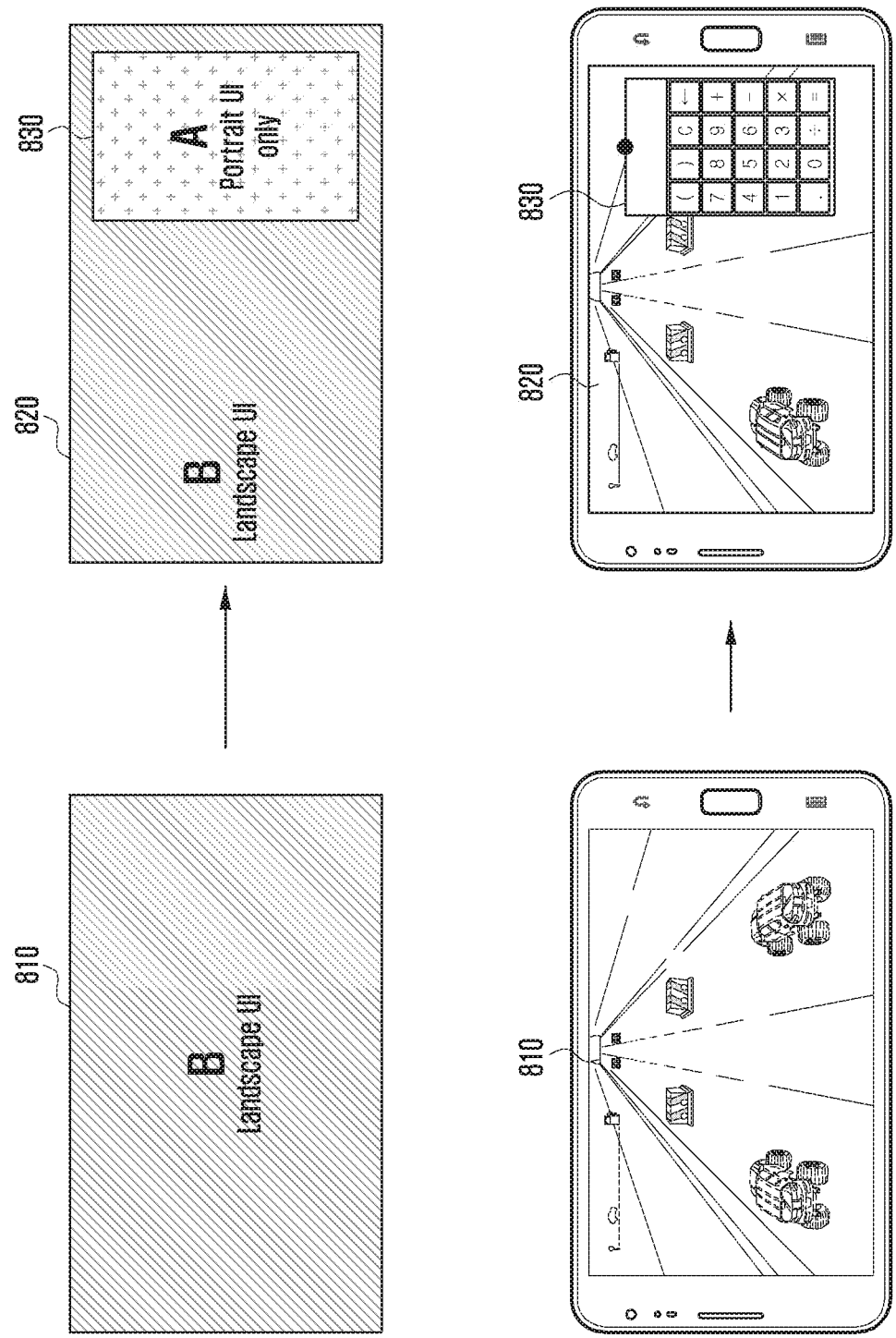

FIG. 8 illustrates an embodiment of a case where an application having a vertically fixed layout is executed in a state where an application having a horizontally fixed layout is executed on the electronic device 400 according to an embodiment of the present disclosure.

Referring to FIG. 8, a game application having a horizontally fixed layout in a state where the display 410 is horizontally oriented may be displayed in a background window 810. Thereafter, when a call application having a vertically fixed layout is executed according to the user's selection, the processor 430 may determine the orientation of the window 830 in the horizontal direction while maintaining the window 830 of the call application in a shape whose vertical length is longer in a state where the background window of the game application is maintained as it is (indicated by reference numeral 820).

In this case, the window 830 may be displayed as a pop-up window where the size thereof is reduced and rotated by 90 degrees in a state of maintaining the horizontal and vertical ratio when compared to a case where the call application alone is executed in the entire area of the display 410.

Figure 9:
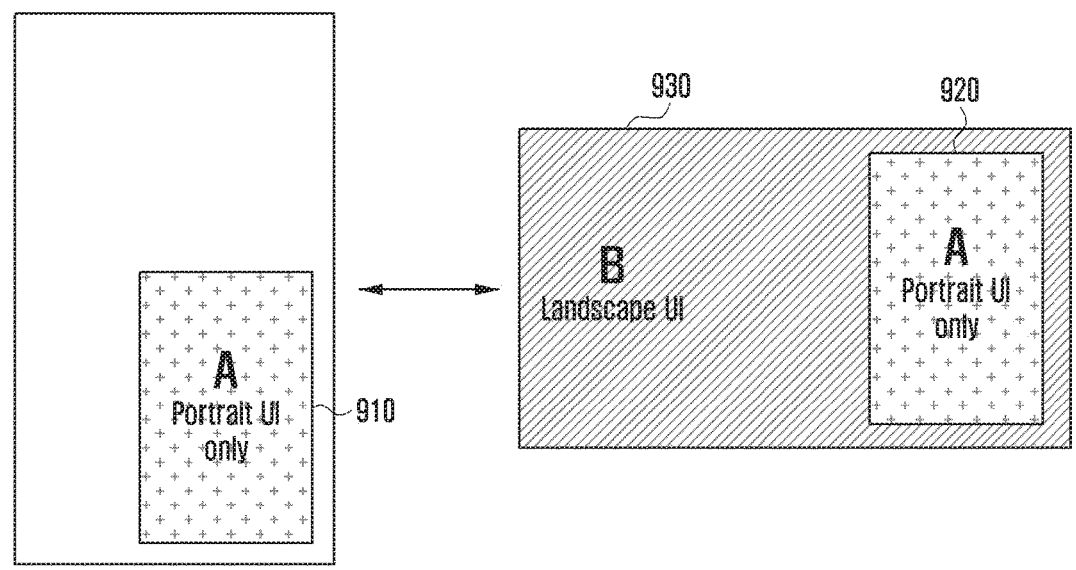
Figure 9:
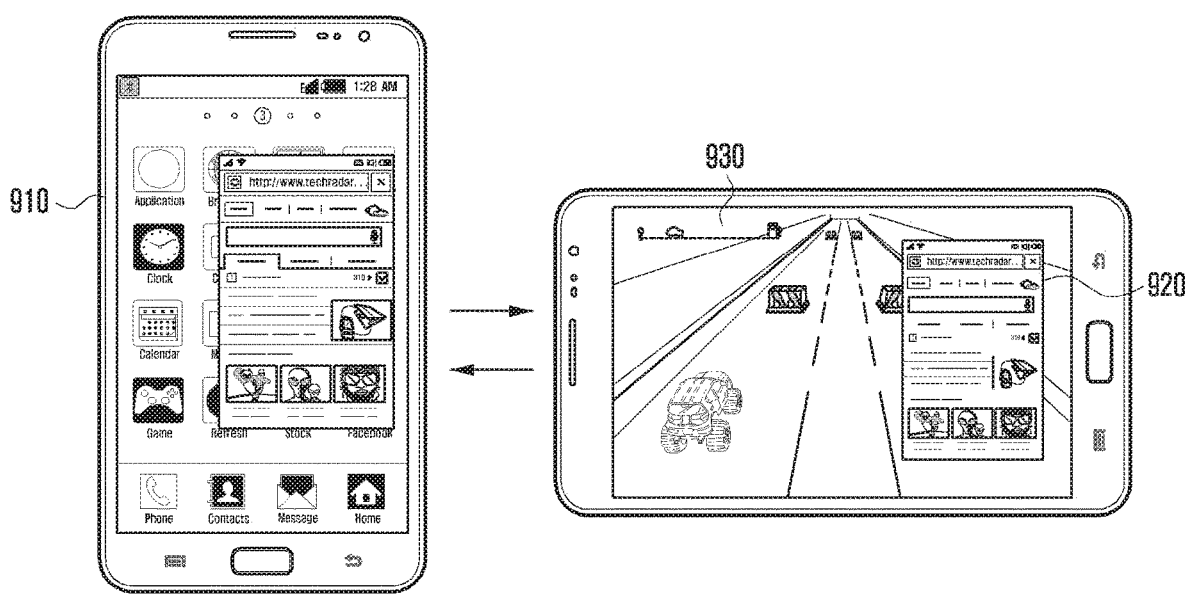

FIG. 9 illustrates an embodiment of a case where an application having a horizontally fixed layout is executed on the background in a state where an application having a vertically fixed layout is executed as the pop-up window on the electronic device 400 according to an embodiment of the present disclosure.

Referring to FIG. 9, the internet browser application having a vertically fixed layout in a state where the display 410 is vertically oriented may be displayed on a part of the display 410 as a pop-up window (indicated by reference numeral 910). Thereafter, when the orientation of the display 410 is horizontally rotated and the game application having a horizontally fixed layout is executed, the game application is horizontally oriented across the entire area of the display 410 and displayed in the background window 930, and the pop-up window of internet applications can be displayed by including the first layout as it is in a state of being rotated 90 degrees (indicated by reference numeral 920).

Figure 10:
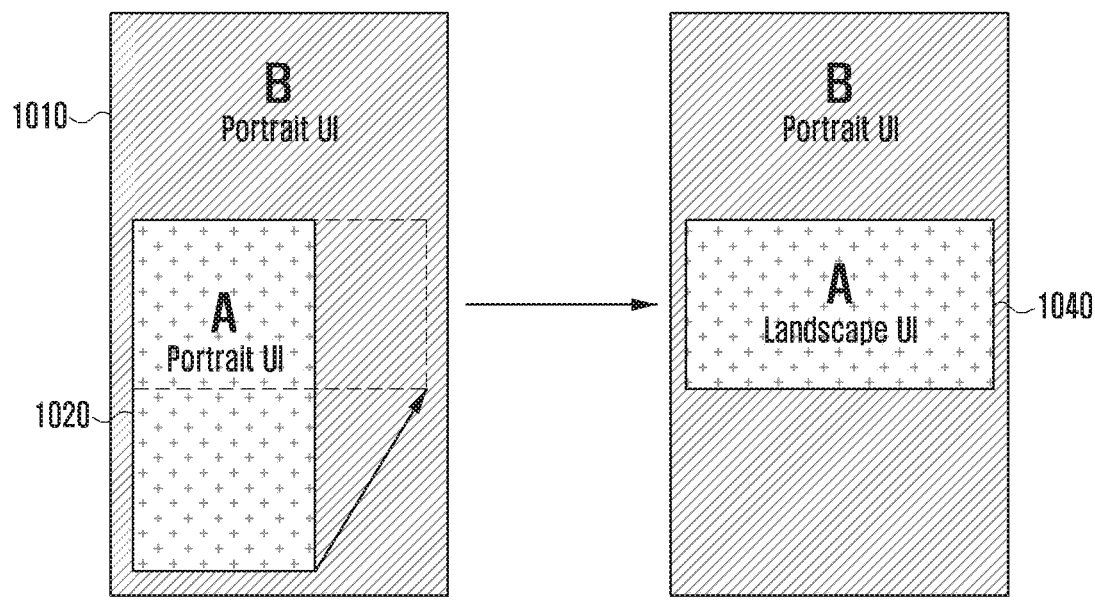
Figure 10:
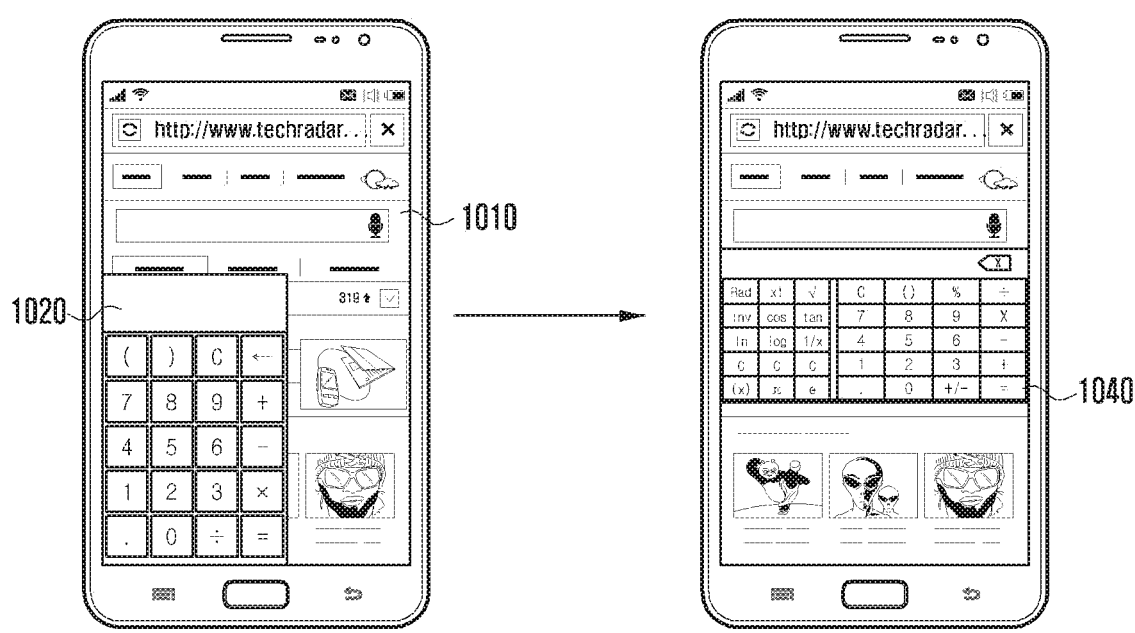

FIG. 10 illustrates an embodiment of a case of changing the size of the pop-up window in the electronic device 400 in a state where an application having a vertically fixed layout is displayed in a background window and an application which can be changed into the first layout and second layout is displayed in a pop-up window according to an embodiment of the present disclosure.

According to various embodiments of the present disclosure, an event for changing the layout may occur when the size of one of the pop-up windows is changed and one of the horizontal length or vertical length of the pop-up window increases by a threshold value or more than the length of the other.

Referring to FIG. 10, in a state where the display 410 is vertically oriented, the internet browser application fixed in a vertical layout is displayed in the background window (indicated by reference numeral 1010), a calculator application having the first layout and second layout may be displayed in a pop-up window in a first layout in a vertical direction (indicated by reference numeral 1020). Here, the size of the calculator application displayed in the pop-up window may be adjusted according to the user's input.

When the size of the pop-up window 1020 is adjusted according to the user's input and the horizontal length of the pop-up window increases by a threshold value or more than the vertical length, the processor 430 may change the pop-up window of the calculator application to a second layout (indicated by reference numeral 1040).

Figure 11:
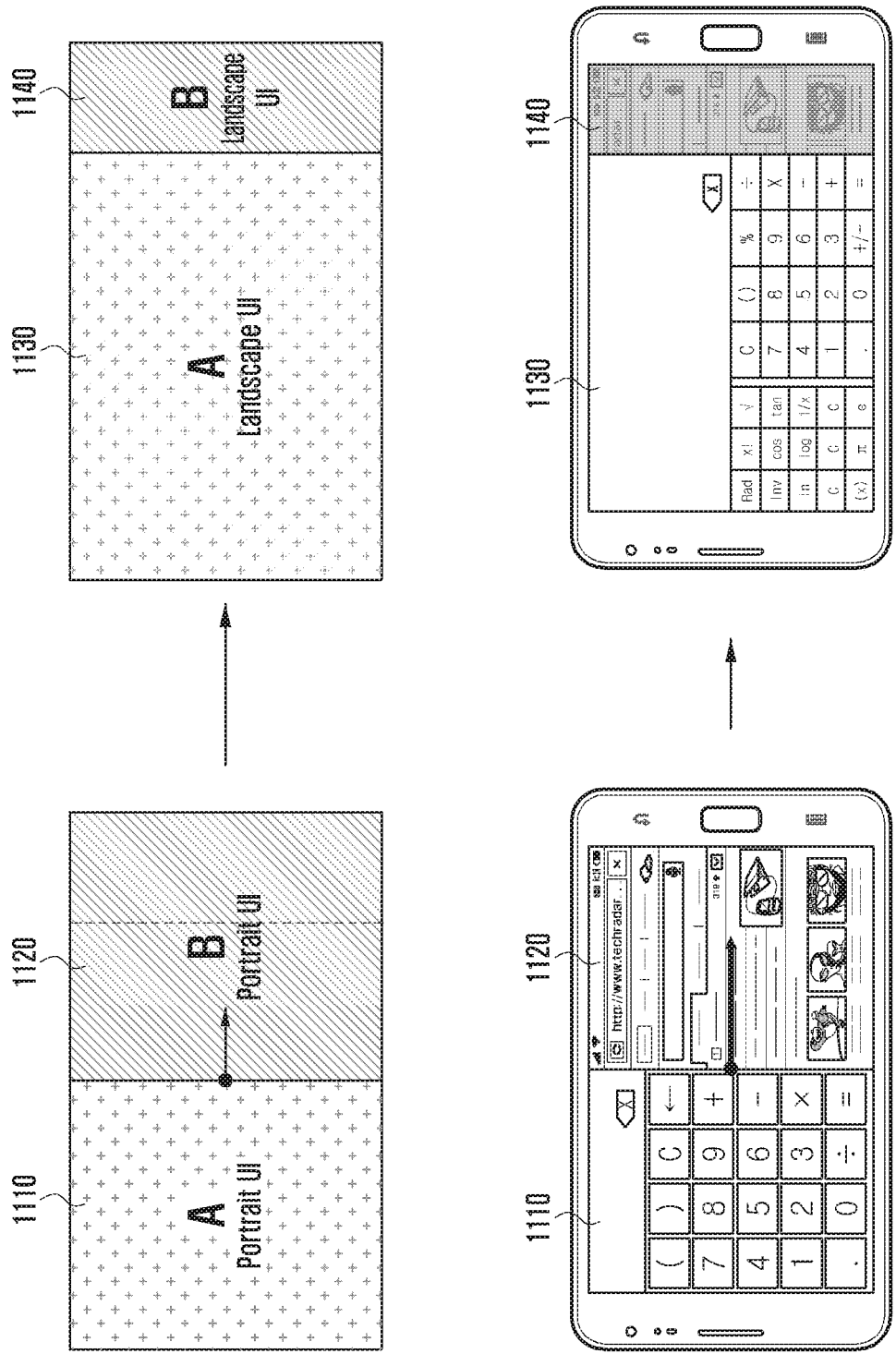

FIG. 11 illustrates an embodiment of a case where the size of one of split windows in the electronic device 400 is changed according to an embodiment of the present disclosure.

According to various embodiments of the present disclosure, a plurality of windows corresponding to a plurality of applications may be displayed on split areas divided from each other in the display 410.

Referring to FIG. 11, when the calculator application and internet browser application having first and second layouts are simultaneously displayed in a split window and the display 410 is horizontally oriented, the display 410 may be divided and displayed as the first layout in a vertical direction (indicated by reference numerals 1110 and 1120).

When the size of the window 1110 of a calculator application is changed according to the user's input and the horizontal length of the window of the calculator application increases by a threshold value or more than the vertical length thereof, the processor 430 may change the window of the calculator application to the second layout in a horizontal direction (indicated by reference numeral 1130). At this time, the window 1140 of the internet browser application may be displayed with a reduced ratio of the vertical length in a state where the first layout is maintained, or at least a part thereof may be displayed in the background area.

Figure 12:
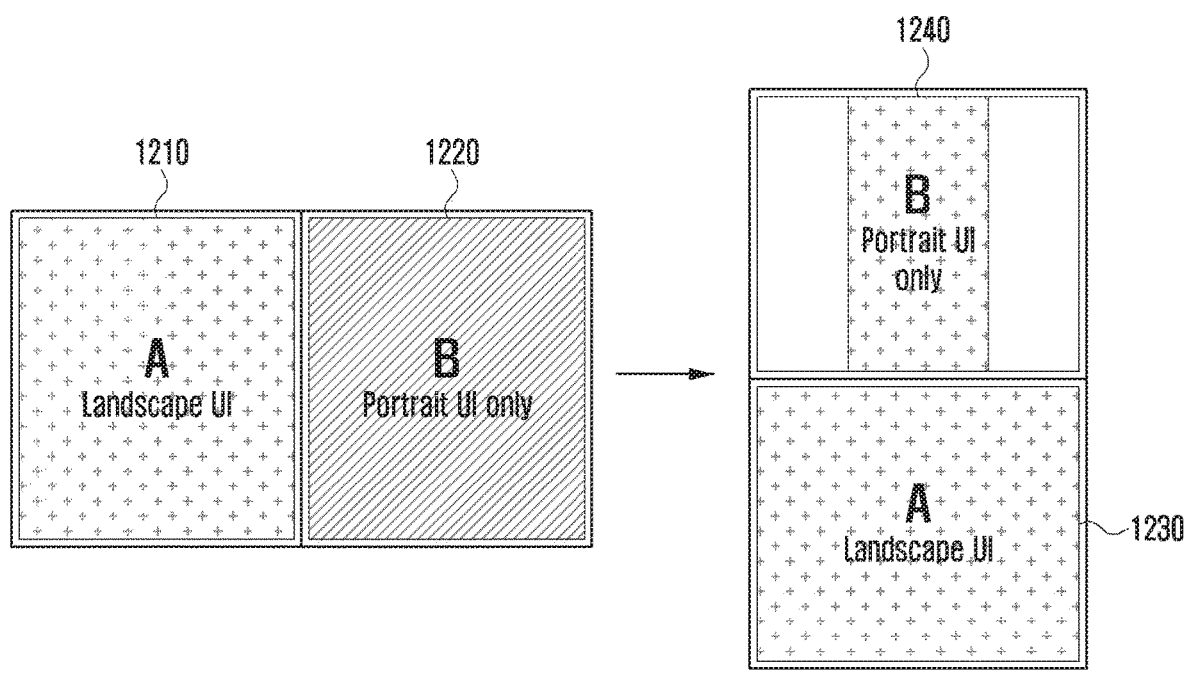

FIG. 12 shows an embodiment of a case where the orientation of the electronic device 400 is changed in a state where an application A, which can be changed to the first and second layouts and an application B having a layout fixed in a vertical orientation are displayed on the split window according to an embodiment of the present disclosure.

Referring to FIG. 12, when the electronic device 400 is horizontally oriented, the screen may be divided in two and both of two applications are displayed in a vertical direction (indicated by reference numerals 1210 and 1220). Here, when the orientation of the display is changed to the vertical direction, the application A, which can be changed to the first and second layouts may be changed to the horizontal layout (indicated by reference numeral 1230), and the application B having a vertically fixed layout may be displayed in the vertical layout (indicated by reference numeral 1240). At this time, as shown in drawing, a window of the application B may be reduced while maintaining the ratio thereof, and at least a part thereof may be omitted and then displayed.

Figure 13:
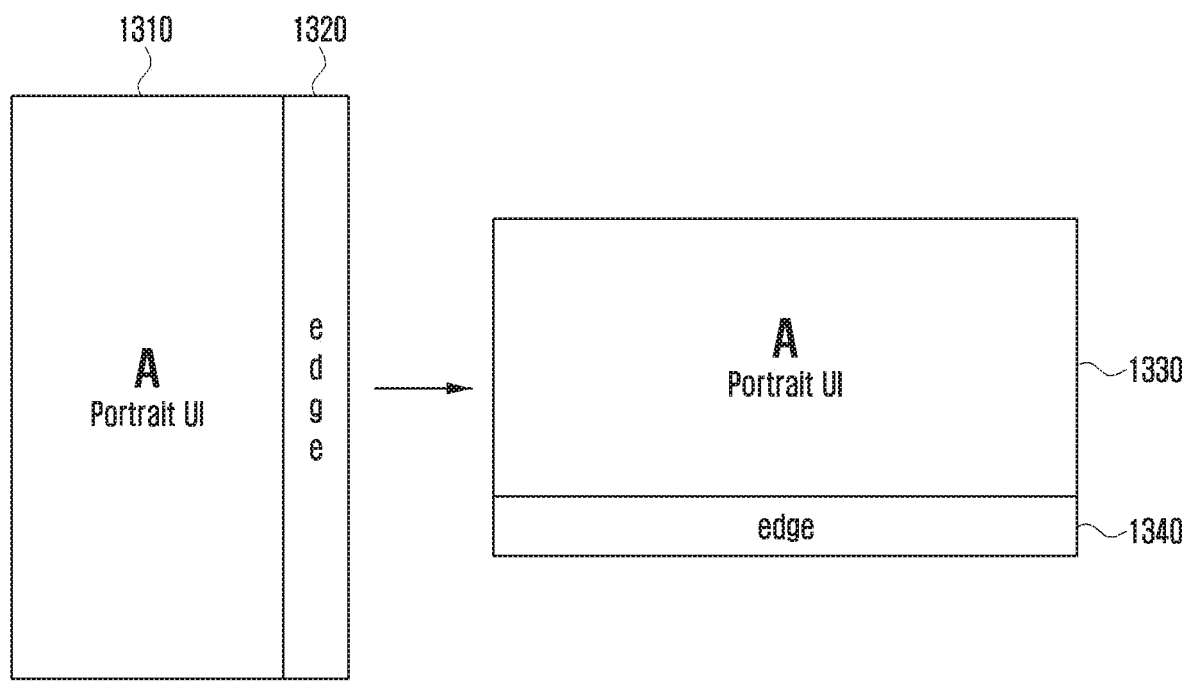

FIG. 13 illustrates an embodiment of a case where the display 410 of the electronic device 400 has an edge area and the orientation of the electronic device 400 is changed according to an embodiment of the present disclosure.

Referring to FIG. 13, various types of indicators and icons may be displayed on an edge area 1320 of the electronic device 400, and at least a part of the displayed indicators or icons may be configured such that the orientation thereof is changed according to the orientation change of the electronic device 400.

When the electronic device 400 is in the vertical direction, an application which can be changed to the first and second layouts is displayed in the vertical direction (indicated by reference numeral 1310), and the screen of the edge area may also be displayed in the vertical direction (indicated by reference numeral 1320). Thereafter, when the orientation of the electronic device 400 is changed to a horizontal direction, the application is changed to the layout of the horizontal direction (indicated by reference numeral 1330) and the layout of the edge area may also be changed to a horizontal direction (indicated by reference numeral 1340).

Unlike those illustrated in FIG. 13, when an application having a fixed layout in the horizontal or vertical direction is displayed, the layout of the application is not changed according to the rotation of the electronic device 400 and only the layout of the edge area is changed.

Although various embodiments of the present disclosure have been described with reference to FIGS. 6A, 6B, 7, 8, 9, 10, 11, 12, and 13, FIGS. 6A, 6B, 7, 8, 9, 10, 11, 12, and 13 have described a case where two applications operate in a multi-window environment, and various embodiments of the present disclosure may be applied to a case where three or more applications operate therein. In addition, the display 410 may include a first area and a second area, and the processor 430 may determine, when an event for changing the layout occurs, window layouts of the first area and second area.

An electronic device according to various embodiments of the present disclosure may include: a rectangular display; at least one sensor; a processor electrically connected to the display and the at least one sensor; and a memory electrically connected to the processor, wherein the memory stores an application program including a first layout to be displayed when the display is substantially oriented in a horizontal orientation and a second layout to be displayed when the display is substantially oriented in a vertical orientation, and the memory stores instructions which, when executed by the processor, cause the processor to perform operations including: displaying a window including one of the first and second layouts on a part of the display; detecting a change in the orientation of the electronic device by using at least one sensor; rotating the window about 90 degrees at least partially based on the detection of the orientation change, and continuously maintaining one of the first and second layouts in the window.

According to various embodiments of the present disclosure, the instructions may be configured to cause the processor to select, when the orientation of the electronic device is changed, whether to continuously maintain one of the first and second layouts in the window, or whether to include one other layout of the first layout or the second layout based on a user input.

According to various embodiments of the present disclosure, the instructions may be configured to cause the processor to select, when the orientation of the electronic device is changed, whether to continuously maintain one of the first and second layout in the window, or whether to include one other layout of the first layout or the second layout, based on at least one piece of information associated with the application.

An electronic device according to various embodiments of the present disclosure may include: a rectangular display; at least one sensor; a processor electrically connected to the display and the at least one sensor; and a memory electrically connected to the processor, wherein the memory stores an application program including a first layout to be displayed when the display is substantially oriented in a horizontal orientation and a second layout when the display is substantially oriented in a vertical orientation, and the memory stores instructions which, when executed by the processor, cause the processor to perform operations including: displaying a window including one of the first and second layouts on a part of the display; managing the selection of the layout in a window displayed on the display at the center; detecting a change in the orientation of the electronic device by using the at least one sensor; when the orientation of the electronic device is changed in response to the detection, identifying whether the displayed window is configured to continuously maintain one of the first and second layouts or to include one other layout thereof; selecting a layout to be included in the displayed window based on the identification; and displaying the window including the selected layout.

An electronic device according to various embodiments of the present disclosure may include: a display; at least one sensor; a processor electrically connected to the display and the at least one sensor; and a memory electrically connected to the processor, wherein the memory stores a plurality of applications including at least one of a first layout to be displayed when the display is oriented in a vertical orientation and a second layout to be displayed when the display is oriented in a horizontal orientation, and the memory stores instructions which, when executed by the processor, cause the processor to perform operations including: when the plurality of applications are executed, creating windows on which the plurality of applications are displayed and displaying the plurality of applications in the first layout or the second layout; and when an event for the change of the layout occurs, determining a layout of each of the plurality of applications on the basis of configuration information on each of the plurality of applications.

According to various embodiments of the present disclosure, wherein the at least one sensor may include a sensor for detecting the orientation of the display, and the event may occur when the orientation of the display is changed.

According to various embodiments of the present disclosure, the configuration information may include information on whether to change the orientation and layout of the window when the event occurs.

According to various embodiments of the present disclosure, when one of the plurality of applications is an application configured to have a fixed layout, the memory may store, when the event occurs, instructions configured to rotate the window in a horizontal or vertical direction and continuously include the fixed layout in the window, with reference to the configuration information.

According to various embodiments of the present disclosure, when one of the plurality of applications is an application configured to change the layout, the memory may store, when the event occurs, instructions configured to maintain the window and include a changed layout of the first layout or the second layout in the window, with reference to the configuration information.

According to various embodiments of the present disclosure, the memory may include an instruction configured to call the configuration information of the at least one application currently being executed when the event occurs; and an instruction configured to create a single screen by combining windows of applications created on the basis of the configuration information.

According to various embodiments of the present disclosure, one of windows corresponding to a plurality of applications is a background window displayed on the background, and one or more other windows may be pop-up windows displayed on a layer above the background window.

According to various embodiments of the present disclosure, the event may occur when the size of one of the pop-up windows is changed according to the user input and one of the horizontal length or vertical length of the pop-up window increases by a threshold value or more than the length of the other.

According to various embodiments of the present disclosure, the windows corresponding to the plurality of applications may be displayed on areas divided from each other in the display.

According to various embodiments of the present disclosure, the display may include the first area and the second area divided from each other, and the memory may include, when the event occurs, an instruction configured to determine layouts of the first area and the second area.

Figure 14:
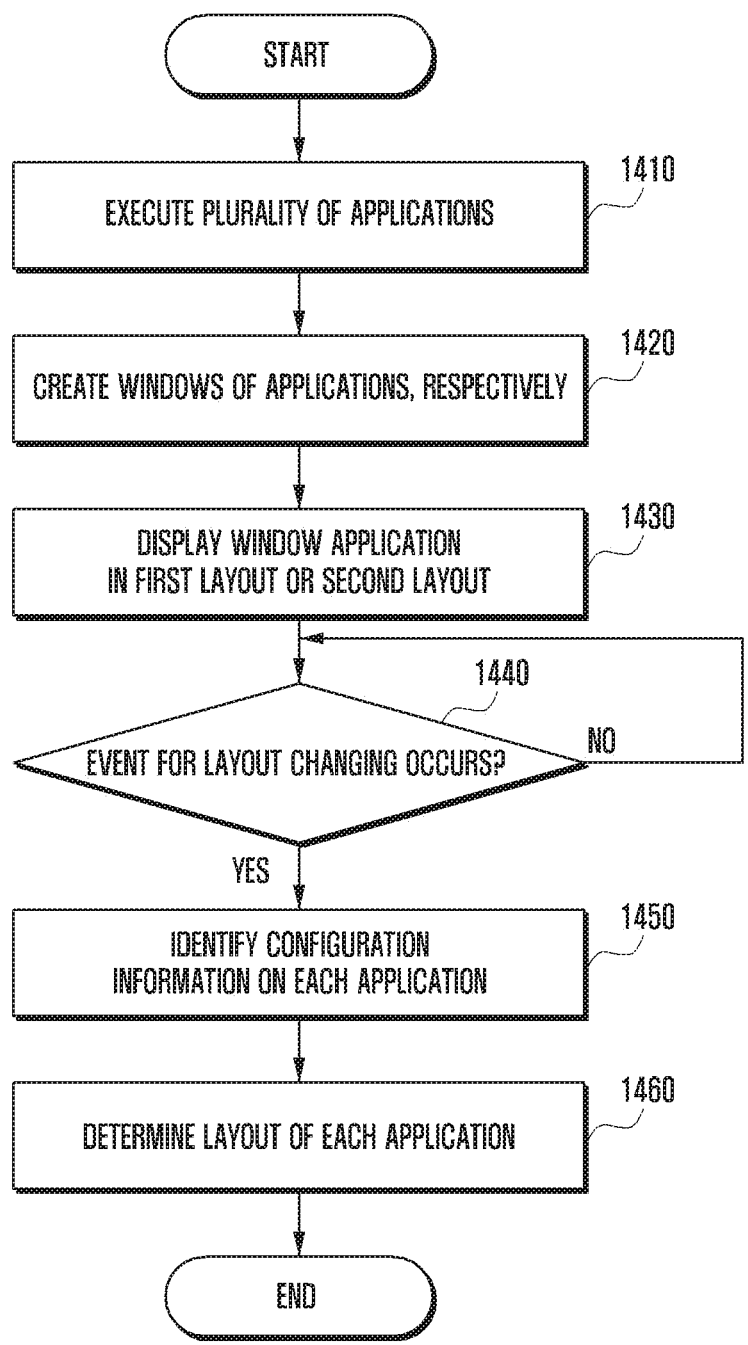
FIG. 14 is a flowchart illustrating a method for configuring a display of an electronic device according to various embodiments of the present disclosure.

FIG. 14 is a flowchart illustrating a method for setting a display of an electronic device according to various embodiments of the present disclosure.

The illustrated method may be performed by an electronic device described with reference to FIGS. 1, 2, 3, 4, 5, 6A, 6B, 7, 8, 9, 10, 11, 12, and 13 above, and hereinafter, the description will be omitted herein for technical features that are identical to the previously described technical features or can be inferred therefrom.

Referring to FIG. 14, in operation 1410, the electronic device may execute two or more applications at the same time.

In operation 1420, the electronic device may create a window for displaying each of the plurality of applications being executed. At this time, one of a plurality of windows may be a background window displayed on the background, and one or more windows may be pop-up windows displayed on a layer above the background window. In addition, the plurality of windows corresponding to the plurality of applications may be split windows defined on areas divided from each other in the display.

In operation 1430, the electronic device may display applications corresponding to the windows as a first layout to be displayed when the display is vertically oriented or a second layout to be displayed when the display is horizontally oriented. The first layout is a shape whose horizontal direction is short and vertical direction is long, and the second layout is a shape whose horizontal direction is long and vertical direction is short, and for example, a part of the information displayed at the bottom on the first layout may be displayed on the right side on the second layout. In addition, at least one other application may have a fixed layout regardless of the orientation of the display. That is, for an application whose layout is fixed in a vertical orientation, even when the orientation of the display is changed from vertical to horizontal, the layout may be not changed and maintain a shape whose vertical length is short and horizontal length is long.

In operation 1440, the electronic device may sense an event for changing the layout. Here, the event for changing the layout may occur when the orientation of the display is changed from horizontal to vertical or vice versa, or the size of one of the pop-up windows is changed according to the user's input so that one of the horizontal length or vertical length of the pop-up window increases by a threshold value or more than the other length of the pop-up window.

In operation 1450, when an event for changing the layout occurs, the electronic device may identify configuration information for each application. According to various embodiments of the present disclosure, each application may include configuration information related to the UI characteristics, and the configuration information may include information on the orientation and layout of a window in which the application is displayed.

In operation 1460, the electronic device may determine the layout of each of the plurality of applications on the basis of the configuration information on each of the plurality of applications. The above description is the same as those previously described in detail through the embodiments of FIGS. 6A, 6B, 6, 7, 9, 10, 11, 12, and 13.

A method for configuring a display of an electronic device according to various embodiments of the present disclosure may include operations of: executing a plurality of applications; creating windows on which the plurality of applications are displayed, respectively, and displaying the plurality of applications, on the window, in a first layout to be displayed when a display is vertically oriented and a second layout to be displayed when the display is horizontally oriented; sensing an event for a change in the layout; and determining a layout of each of the plurality of applications based on the configuration information on each of the plurality of applications.

According to various embodiments of the present disclosure, the operation for sensing of the event may include an operation for detecting the change in the orientation of the display.

According to various embodiments of the present disclosure, the configuration information may include information on whether to change the orientation and layout of the window when the event occurs.

According to various embodiments of the present disclosure, the operation for determining of the layout may include, when one of the plurality of applications is an application configured to have a fixed layout, rotating the window in a horizontal or vertical direction and continuously including the fixed layout in the window, with reference to the configuration information.

According to various embodiments of the present disclosure, the operation for determining of the layout may include, when one of the plurality of applications is an application configured to change the layout, maintaining the window and including a changed layout of the first layout or the second layout in the window, with reference to the configuration information.

According to various embodiments of the present disclosure, the operation for determining of the layout may include: calling the configuration information of the at least one application currently being executed when the event occurs; and creating a single screen by combining windows of applications created on the basis of the configuration information.

According to various embodiments of the present disclosure, one of windows corresponding to a plurality of applications may be a background window displayed on the background, and one or more other windows may be pop-up windows displayed on a layer above the background window.

According to various embodiments of the present disclosure, the operation for sensing of the event may include: sensing a case where the size of one of the pop-up windows is changed according to the user input so that one of the horizontal length or vertical length of the pop-up window increases by a threshold value or more than the length of the other.

According to various embodiments of the present disclosure, windows corresponding to the plurality of applications may be displayed on areas divided from each other in the display.

According to various embodiments of the present disclosure, the operation for determining of the layout may include: determining layouts of the first area and second area, respectively, when the event occurs.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display;
at least one sensor;
a processor electrically connected to the display and the at least one sensor; and
a memory electrically connected to the processor,
wherein the memory stores an application including a first layout that is longer vertically than horizontally and a second layout that is longer horizontally than vertically, and
wherein the memory stores instructions which, when executed by the processor, cause the processor to perform operations comprising:
displaying a first window in the first layout and a second window in the first layout, wherein the first window is displayed as a pop-up window on a part of the display and the second window is displayed as a background window of the second window on the display,
detecting a change in orientation of the electronic device by using the at least one sensor,
rotating the first window and the second window 90 degrees at least partially based on the detection of the change in orientation,
based on the detection of the change in orientation, determining whether to change the first window and the second window from the first layout to the second layout,
in response to a determination to not change the first layout of the first window, maintaining a horizontal to vertical ratio of the first layout of the first window before and after the rotating of the first window, and
in response to a determination to change the first layout of the second window to the second layout, displaying the second window in the second layout after the rotating of the second window, wherein a horizontal length of the second window displayed in the second layout is a same length as a vertical length of the second window displayed in the first layout, and a vertical length of the second window displayed in the second layout is a same length as a horizontal length of the second window displayed in the first layout.

2. The electronic device of claim 1, wherein the orientation of the electronic device is changed based on a user input.

3. The electronic device of claim 1, wherein the orientation of the electronic device is changed based on at least one piece of information associated with the application.

4. An electronic device comprising:
a display;
at least one sensor;
a processor electrically connected to the display and the at least one sensor; and
a memory electrically connected to the processor,
wherein the memory stores a plurality of applications including at least one of a first layout that is longer vertically than horizontally or a second layout that is longer horizontally than vertically, and
wherein the memory further stores instructions which, when executed by the processor, cause the processor to perform operations comprising:
when a first application and a second application are executed, creating a first window on which the first application is displayed and a second window on which the second application is displayed and displaying the first window in the first layout and the second window in the first layout, wherein the first window is displayed as a pop-up window on a part of the display and the second window is displayed as a background window of the second window on the display,
when an event for a change of layout occurs, determining a layout of each of the first window and the second window on a basis of configuration information on each of the first application and the second application,
when the event occurs and the first application is configured to have a fixed layout, rotating the first window to continuously maintain a horizontal to vertical ratio of the first window based on the configuration information, and
when the event occurs and the second application is configured to change a layout of the second window, rotating the second window and changing the second window from the first layout to the second layout, wherein a horizontal length of the second window displayed in the second layout is a same length as a vertical length of the second window displayed in the first layout, and a vertical length of the second window displayed in the second layout is a same length as a horizontal length of the second window displayed in the first layout.

5. The electronic device of claim 4,
wherein the at least one sensor comprises a sensor for detecting orientation of the display, and
wherein the event is generated when the orientation of the display is changed.

6. The electronic device of claim 4, wherein the configuration information comprises information on whether to change orientation and layout of a window when the event occurs.

7. The electronic device of claim 4, wherein the event occurs when a size of the pop-up window is changed according to a user input and one of a horizontal length or a vertical length of the pop-up window increases by a threshold value or more than another one of the horizontal length or the vertical length of the pop-up window.

8. The electronic device of claim 4, wherein the first window and the second window are displayed on areas divided from each other on the display.

9. A method for configuring a display of an electronic device, the method comprising:
executing a first application and a second application, the first application and the second application including at least one of a first layout that is longer vertically than horizontally or a second layout that is longer horizontally than vertically;

displaying a first window in the first layout and a second window in the first layout, wherein the first window is displayed as a pop-up window on a part of the display and the second window is displayed as a background window of the second window on the display;

sensing an event for a change in layout;

determining a layout of each of the first window and the second window based on configuration information on each of the first application and the second application;

when the event occurs and the first application is configured to have a fixed layout, rotating the first window to continuously maintain a horizontal to vertical ratio of the first window based on the configuration information; and when the event occurs and the second application is configured to change a layout of the second window, rotating the second window and changing the second window from the first layout to the second layout, wherein a horizontal length of the second window displayed in the second layout is a same length as a vertical length of the second window displayed in the first layout, and a vertical length of the second window displayed in the second layout is a same length as a horizontal length of the second window displayed in the first layout.

10. The method of claim 9, wherein the sensing of the event comprises: sensing a change in orientation of the display.

11. The method of claim 9, wherein the configuration information comprises information on whether to change the orientation or layout of a window when the event occurs.

12. The method of claim 9, wherein the sensing of the event comprises:

sensing a case where a size of the pop-up window is changed according to a user input so that one of a horizontal length or a vertical length of the pop-up window increases by a threshold value or more than another one of the horizontal length or the vertical length of the pop-up window.

13. The method of claim 9, wherein the first window and the second window are displayed on areas divided from each other on the display.

* * * * *